United States Patent
Iguchi et al.

(10) Patent No.: US 9,769,380 B2
(45) Date of Patent: Sep. 19, 2017

(54) IMAGE PROCESSING APPARATUS, METHOD, AND STORAGE MEDIUM FOR OBTAINING WATERMARK INFORMATION

(71) Applicant: CANON KABUSHIKI KAISHA, Tokyo (JP)

(72) Inventors: Ryosuke Iguchi, Kawasaki (JP); Yuki Ishida, Kawasaki (JP); Wei Song, Kawasaki (JP); Nobutaka Miyake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/837,505

(22) Filed: Aug. 27, 2015

(65) Prior Publication Data

US 2016/0080648 A1 Mar. 17, 2016

(30) Foreign Application Priority Data

Sep. 12, 2014 (JP) ................................. 2014-187034

(51) Int. Cl.
*H04N 1/32* (2006.01)
*H04N 5/232* (2006.01)
(Continued)

(52) U.S. Cl.
CPC ......... *H04N 5/23238* (2013.01); *G06T 1/005* (2013.01); *H04N 5/2353* (2013.01);
(Continued)

(58) Field of Classification Search
None
See application file for complete search history.

(56) References Cited

U.S. PATENT DOCUMENTS 4,918,541 A 4/1990 Ishida et al.
5,060,280 A 10/1991 Mita et al.
(Continued)

FOREIGN PATENT DOCUMENTS

JP 2003-348327 A 12/2003

OTHER PUBLICATIONS

U.S. Appl. No. 14/834,953, filed Aug. 25, 2015.
U.S. Appl. No. 14/835,863, filed Aug. 26, 2015.
U.S. Appl. No. 14/844,211, filed Sep. 3, 2015.

*Primary Examiner* — Paul F Payer
(74) *Attorney, Agent, or Firm* — Fitzpatrick, Cella, Harper & Scinto

(57) ABSTRACT

An image processing apparatus obtains information of a digital watermark based on an image obtained by causing an image capturing device to capture a print product in which the digital watermark is embedded. An image capturing unit is configured to cause the image capturing device to capture a plurality of areas on the print product by repeating continuous shooting a plurality of times under a plurality of image capturing conditions. A selection unit is configured to select, from a plurality of images obtained by the plurality of times of the continuous shooting by the image capturing unit, an image from which the information of the digital watermark is to be obtained. An obtaining unit is configured to obtain the information of the digital watermark based on the image selected by the selection unit from the plurality of images obtained by the respective times of the continuous shooting by the image capturing unit.

22 Claims, 14 Drawing Sheets

(51) Int. Cl.
  *H04N 5/235* (2006.01)
  *G06T 1/00* (2006.01)
  *G06T 3/40* (2006.01)

(52) U.S. Cl.
  CPC ....... *H04N 5/2356* (2013.01); *H04N 5/23212* (2013.01); *H04N 5/23229* (2013.01); *H04N 5/23232* (2013.01); *H04N 5/23258* (2013.01); *G06T 3/4053* (2013.01); *G06T 2201/0061* (2013.01); *G06T 2201/0065* (2013.01)

(56) References Cited

U.S. PATENT DOCUMENTS

| | | | | |
|---|---|---|---|---|
| 5,493,415 | A | 2/1996 | Mita et al. | |
| 5,680,486 | A | 10/1997 | Mita et al. | |
| 5,714,985 | A | 2/1998 | Kawamura et al. | |
| 5,848,185 | A | 12/1998 | Koga et al. | |
| 5,905,579 | A | 5/1999 | Katayama et al. | |
| 6,009,213 | A | 12/1999 | Miyake | |
| 6,556,711 | B2 | 4/2003 | Koga et al. | |
| 6,661,838 | B2 | 12/2003 | Koga et al. | |
| 7,006,668 | B2 | 2/2006 | Iguchi et al. | |
| 7,103,214 | B2 | 9/2006 | Kusakabe et al. | |
| 7,167,205 | B2 | 1/2007 | Akiyama et al. | |
| 7,177,463 | B2 | 2/2007 | Kusakabe et al. | |
| 7,218,751 | B2 * | 5/2007 | Reed | G06K 9/00 382/100 |
| 7,408,680 | B2 * | 8/2008 | Miyake | G06T 1/0028 358/3.01 |
| 7,433,538 | B2 | 10/2008 | Kusakabe et al. | |
| 7,634,153 | B2 | 12/2009 | Miyake et al. | |
| 7,738,030 | B2 | 6/2010 | Akiyama et al. | |
| 7,830,537 | B2 * | 11/2010 | Beadle | H04N 1/00843 358/1.14 |
| 8,023,764 | B2 | 9/2011 | Miyake et al. | |
| 8,150,208 | B2 * | 4/2012 | Misawa | G06K 9/00228 382/118 |
| 8,306,357 | B2 | 11/2012 | Miyake et al. | |
| 8,600,154 | B2 | 12/2013 | Umeda et al. | |
| 8,638,363 | B2 * | 1/2014 | King | G06F 17/211 340/937 |
| 8,675,249 | B2 | 3/2014 | Umeda et al. | |
| 8,744,209 | B2 | 6/2014 | Miyake et al. | |
| 8,823,861 | B2 * | 9/2014 | Yoshida | G03B 13/36 348/208.12 |
| 8,929,681 | B2 | 1/2015 | Umeda et al. | |
| 9,036,205 | B2 | 5/2015 | Umeda et al. | |
| 9,088,753 | B2 | 7/2015 | Akiba et al. | |
| 9,386,235 | B2 * | 7/2016 | Ma | G06K 9/00624 |
| 2004/0046896 | A1 | 3/2004 | Koga et al. | |
| 2006/0028689 | A1 * | 2/2006 | Perry | H04N 1/32144 358/3.28 |
| 2016/0191784 | A1 * | 6/2016 | Murayama | G02B 27/0075 348/347 |

* cited by examiner

FIG. 5
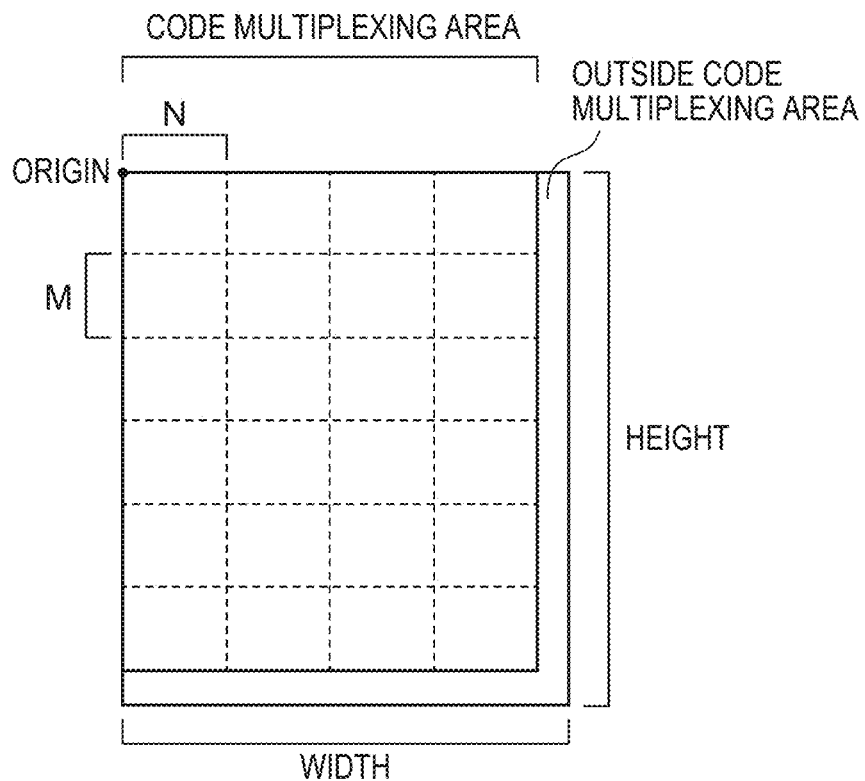
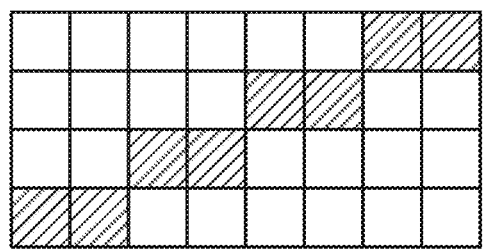
FIG. 6A
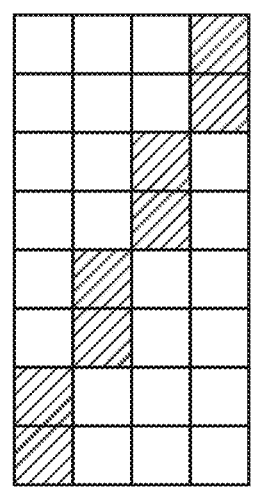
FIG. 6B

FIG. 8
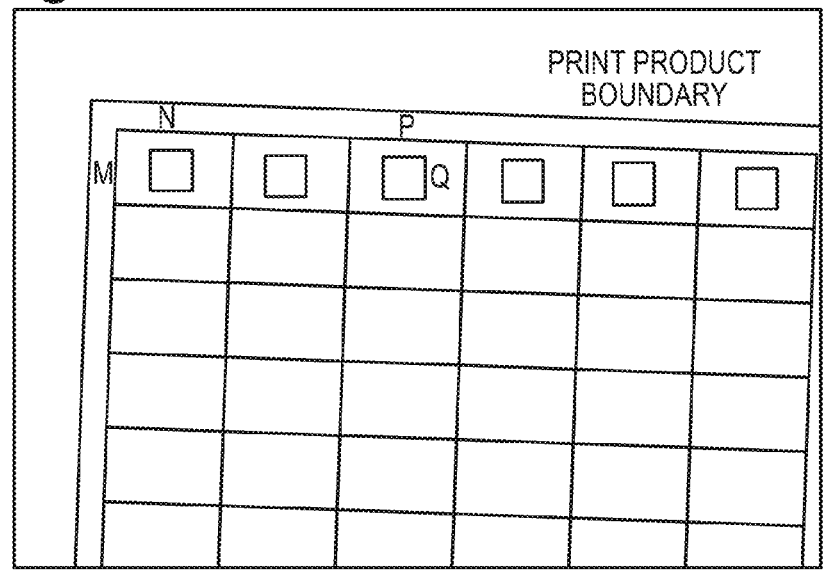
FIG. 9A      FIG. 9B
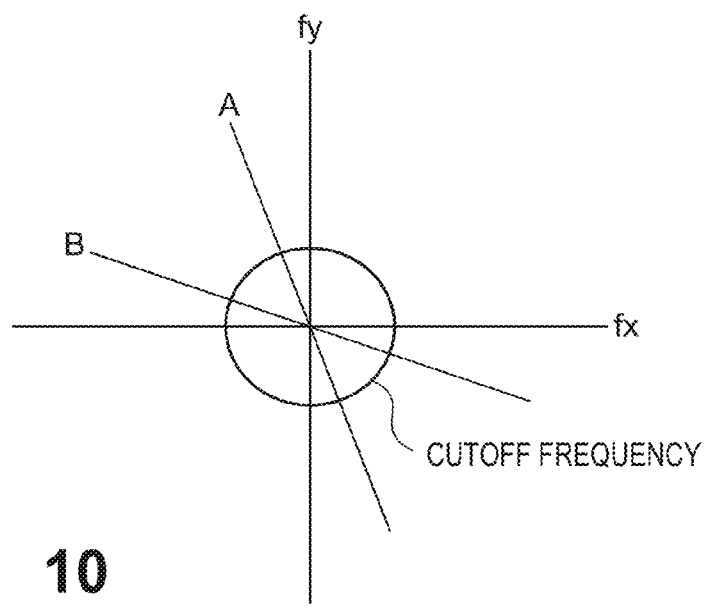
FIG. 10

FIG. 12

| 3 | 3 | 2 | 2 | 1 | 1 | 0 | 0 | 3 | 3 | 2 | 2 | 1 | 1 | 0 | 0 |
|---|---|---|---|---|---|---|---|---|---|---|---|---|---|---|---|
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |

FIG. 13

| 3 | 2 | 1 | 0 | 3 | 2 | 1 | 0 | 3 | 2 | 1 | 0 | 3 | 2 | 1 | 0 |
|---|---|---|---|---|---|---|---|---|---|---|---|---|---|---|---|
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 0 | 0 | 3 | 2 | 1 | 0 | 3 | 2 | 1 | 0 | 3 | 2 |
| 1 | 0 | 3 | 2 | 0 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |
| 3 | 2 | 1 | 0 | 3 | 2 | 1 | 0 | 3 | 2 | 1 | 0 | 3 | 2 | 1 | 0 |
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 0 | 0 | 3 | 2 | 1 | 0 | 3 | 2 | 1 | 0 | 3 | 2 |
| 1 | 0 | 3 | 2 | 0 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |

F I G. 18A
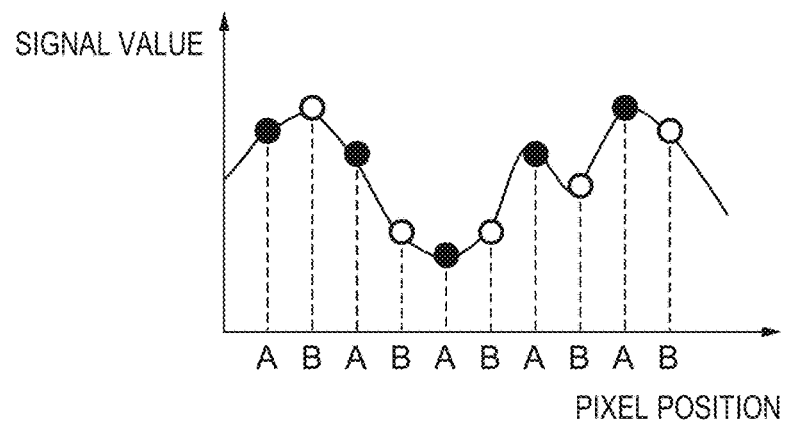
F I G. 18B
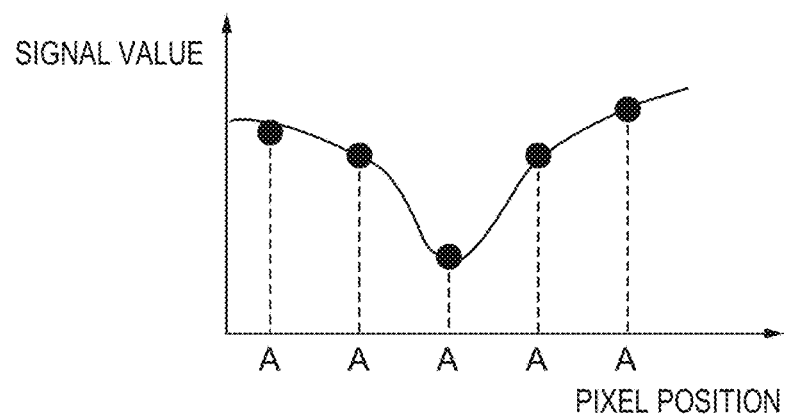
F I G. 18C
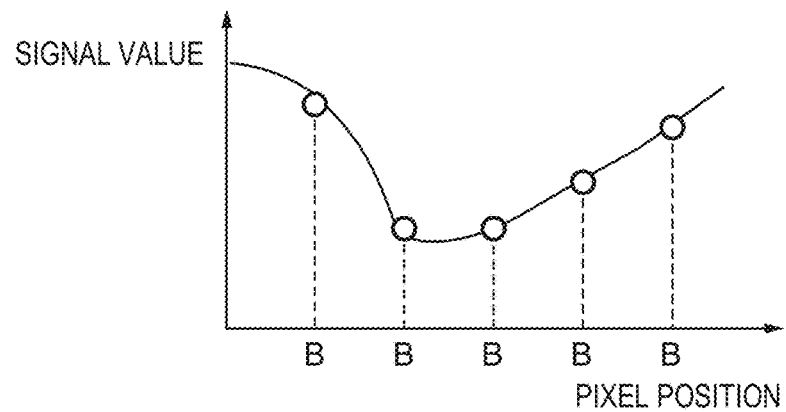

FIG. 19
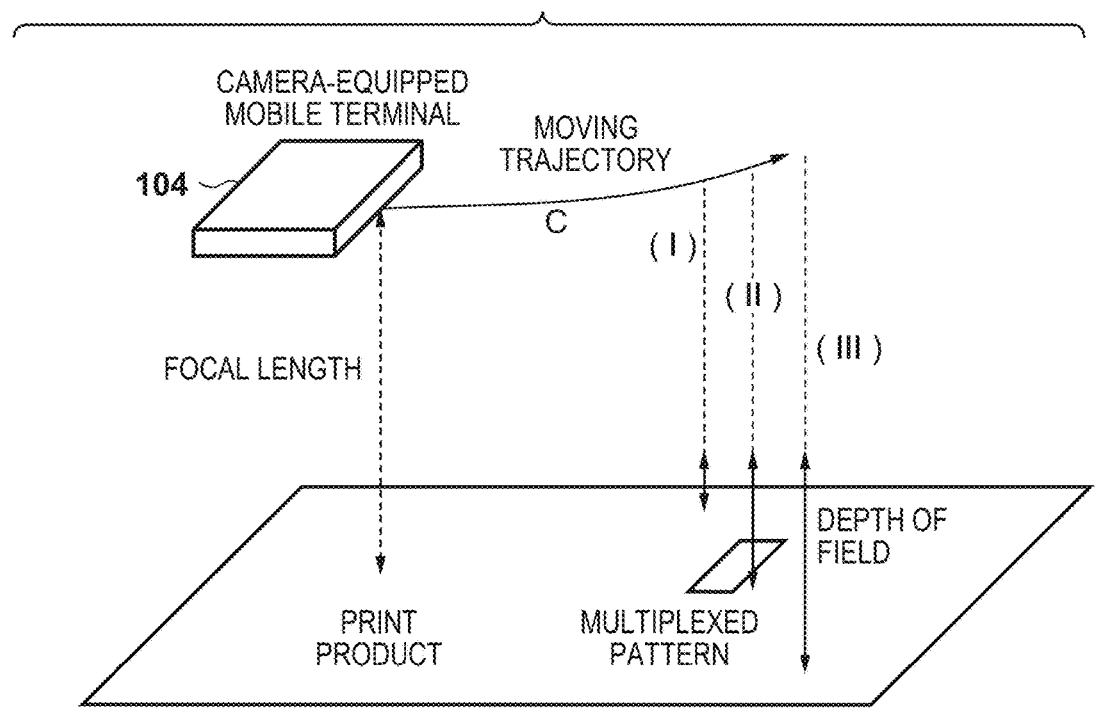
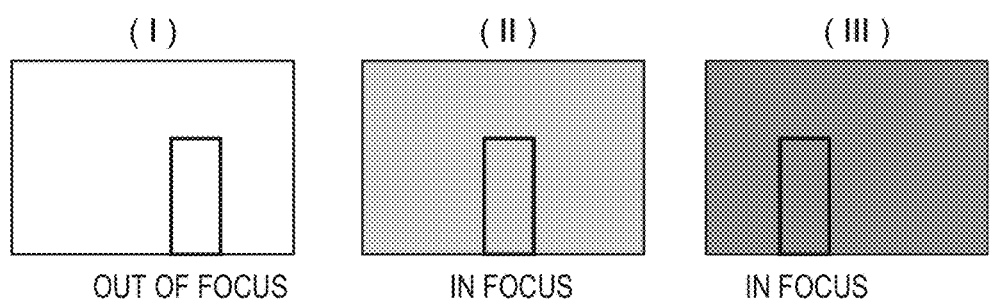

IMAGE PROCESSING APPARATUS, METHOD, AND STORAGE MEDIUM FOR OBTAINING WATERMARK INFORMATION

BACKGROUND OF THE INVENTION

Field of the Invention

The present invention relates to an image processing apparatus, image processing method, and storage medium, and particularly to a technique of reading out and processing additional information from a print product in which information other than image information, for example, voice information, text information, and pieces of information about an image are embedded as additional information in the image.

Description of the Related Art

Conventionally, extensive studies have been made on multiplexing other information associated with an image in image information. Recently, a so-called digital watermark technique is being standardized. This technique multiplexes, in image information of a photograph, painting, or the like, additional information such as the author name and permission/inhibition of the use so that it is difficult to visually discriminate the additional information. The image information is then distributed through a network such as the Internet.

As another application field, there is a technique of embedding additional information in an image in order to specify an output device and its device number from an image output on a print medium, in order to prevent forgery of a banknote, stamp, securities, and the like along with the improvement of the image qualities of image output apparatuses such as a copying machine and printer.

Even a technique of reading out additional information from a digital watermark-embedded print product by using an image capturing device such as a camera is being examined. For example, Japanese Patent Laid-Open No. 2003-348327 proposes a technique of capturing, by a camera-equipped mobile phone, a print product in which the URL of the save location of voice data is embedded as a digital watermark, reading additional information, and at that time, correcting an image distortion arising from a photographing lens.

However, the related art has the following problem.

In a case where a digital watermark is embedded in a wide range of a print product, the entire digital watermark-embedded printed area cannot be captured by one shooting, and needs to be captured separately a plurality of times while moving an image capturing medium such as a camera. However, when the user captures the print product while moving the image capturing device such as a camera held by the hand on the image capturing target, a camera shake may cause to blur the captured image. In particular, the distance between the object and the camera changes during movement, and out-of-focus may occur. This problem cannot be solved by the above-mentioned technique.

SUMMARY OF THE INVENTION

Accordingly, the present invention is conceived as a response to the above-described disadvantages of the conventional art.

For example, an image processing apparatus, image processing method, and storage medium according to this invention are capable of accurately reading a digital watermark embedded in a print product even when the user captures the print product while holding an image capturing device such as a camera by the hand and moving it.

According to one aspect of the present invention, there is provided an image processing apparatus that obtains information of a digital watermark based on an image obtained by causing an image capturing device to capture a print product in which the digital watermark is embedded, comprising: an image capturing unit configured to cause the image capturing device to capture a plurality of areas on the print product by repeating continuous shooting a plurality of times under different image capturing conditions; a selection unit configured to select, from a plurality of images obtained by the plurality of times of the continuous shooting by the image capturing unit, an image from which the information of the digital watermark is to be obtained; and an obtaining unit configured to obtain the information of the digital watermark based on the image selected by the selection unit from the plurality of images obtained by the respective times of the continuous shooting by the image capturing unit.

The invention is particularly advantageous since it has an effect capable of capturing an image in which out-of-focus is suppressed, even when the user captures a print product separately a plurality of times while holding an image capturing device such as a camera by the hand and moving it. Even in a case where a digital watermark is embedded in a wide range of the print product, all the digital watermark can be read.

Further features of the present invention will become apparent from the following description of exemplary embodiments (with reference to the attached drawings).

BRIEF DESCRIPTION OF THE DRAWINGS

FIG. 5 is a view showing one image in which the horizontal pixel count is WIDTH and the vertical pixel count is HEIGHT.

FIGS. 6A and 6B are views showing an example of quantization conditions A and B.

FIG. 8 is a view showing the relationship with a print product included in a captured image.

FIGS. 9A and 9B are views showing examples of a spatial filter used in an additional information demultiplexing unit.

FIG. 10 is a view showing an outline of processing in a two-dimensional frequency region according to the first embodiment.

FIGS. 12 and 13 are views showing in the table format a thinning method in a case where the block size is P=Q=16.

FIGS. 18A, 18B, and 18C are graphs for explaining the mechanism of super-resolution processing.

FIG. 19 is a view showing the relationship between the variation of the depth of field and the focus state when continuous shooting is performed by F-number bracket shooting.

DESCRIPTION OF THE EMBODIMENTS

Exemplary embodiments of the present invention will now be described in detail in accordance with the accompanying drawings. However, the relative arrangement of components and the like set forth in the embodiments do not intend to limit the scope of the invention to them, unless otherwise specified.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

An image processing apparatus according to each of embodiments to be described below includes an additional information multiplexing unit that embeds additional information in a print product, and an additional information demultiplexing unit that reads the additional information from the print product. It is efficient to implement the additional information multiplexing unit as printer driver software or application software in a computer that generates image information to be output to a printer engine. However, it is also effective to integrate the additional information multiplexing unit as hardware and software in a copying machine, facsimile apparatus, printer main body, or the like. In contrast, the additional information demultiplexing unit is implemented in a camera-equipped mobile phone, camera-equipped smartphone, tablet PC, or the like. A device having an image capturing function will be called a camera-equipped mobile terminal. The additional information demultiplexing unit may be, for example, a series of units that separate additional information by application software in a computer from an image captured by a digital still camera.

Common Embodiment

Figure 1:
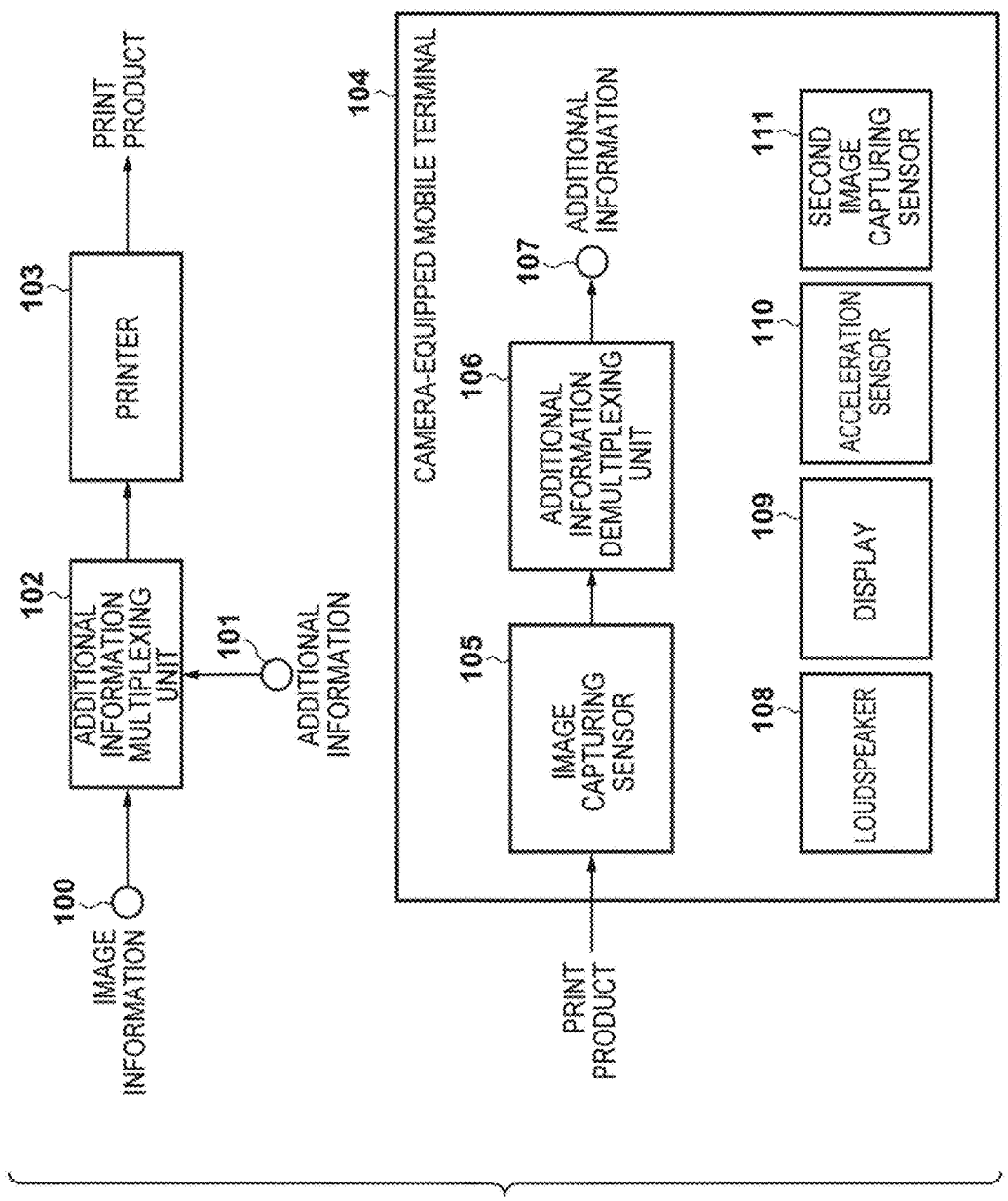
FIG. 1 is a block diagram showing the arrangement of an image processing system according to an embodiment of the present invention.

FIG. 1 is a block diagram showing the arrangement of an image processing system according to an embodiment of the present invention. In FIG. 1, multi-valued image information is input from an input terminal 100, and necessary additional information to be embedded in the image information is input from an input terminal 101. The additional information is considered to be information other than the image information input from the input terminal 100, for example, voice information, moving image information, text information, pieces of information such as the copyright, shooting date & time, shooting location, and user regarding an image input from the input terminal 100, and another image information.

An additional information multiplexing unit 102 embeds additional information in image information so as for human eyes to be difficult to visually discriminate the additional information. The additional information multiplexing unit 102 executes even quantization processing of input multi-valued image information, together with multiplexing of additional information. A printer 103 receives information generated by the additional information multiplexing unit 102, and outputs an additional information-multiplexed image from an internal printer engine. The printer 103 can use a printer engine employing an inkjet method, a printer engine employing an electrophotographic method, or the like. Regardless of the printer engine used, the printer 103 implements a halftoning representation by pseudo-halftoning.

An image capturing sensor 105 of a camera-equipped mobile terminal 104 reads information on a print product output from the printer 103. An additional information demultiplexing unit 106 separates the additional information embedded in the print product and outputs it from an output terminal 107. The output terminal 107 is an interface that outputs obtained additional information. The output terminal 107 outputs additional information to a loudspeaker 108 of the camera-equipped mobile terminal 104 in a case where the additional information is voice information, and outputs it to a display 109 in a case where the additional information is image information. The interface may be an interface that outputs data to an external device. In a case where the camera-equipped mobile terminal 104 includes a plurality of image capturing sensors, a second image capturing sensor 111 may capture a print product.

Figure 2:
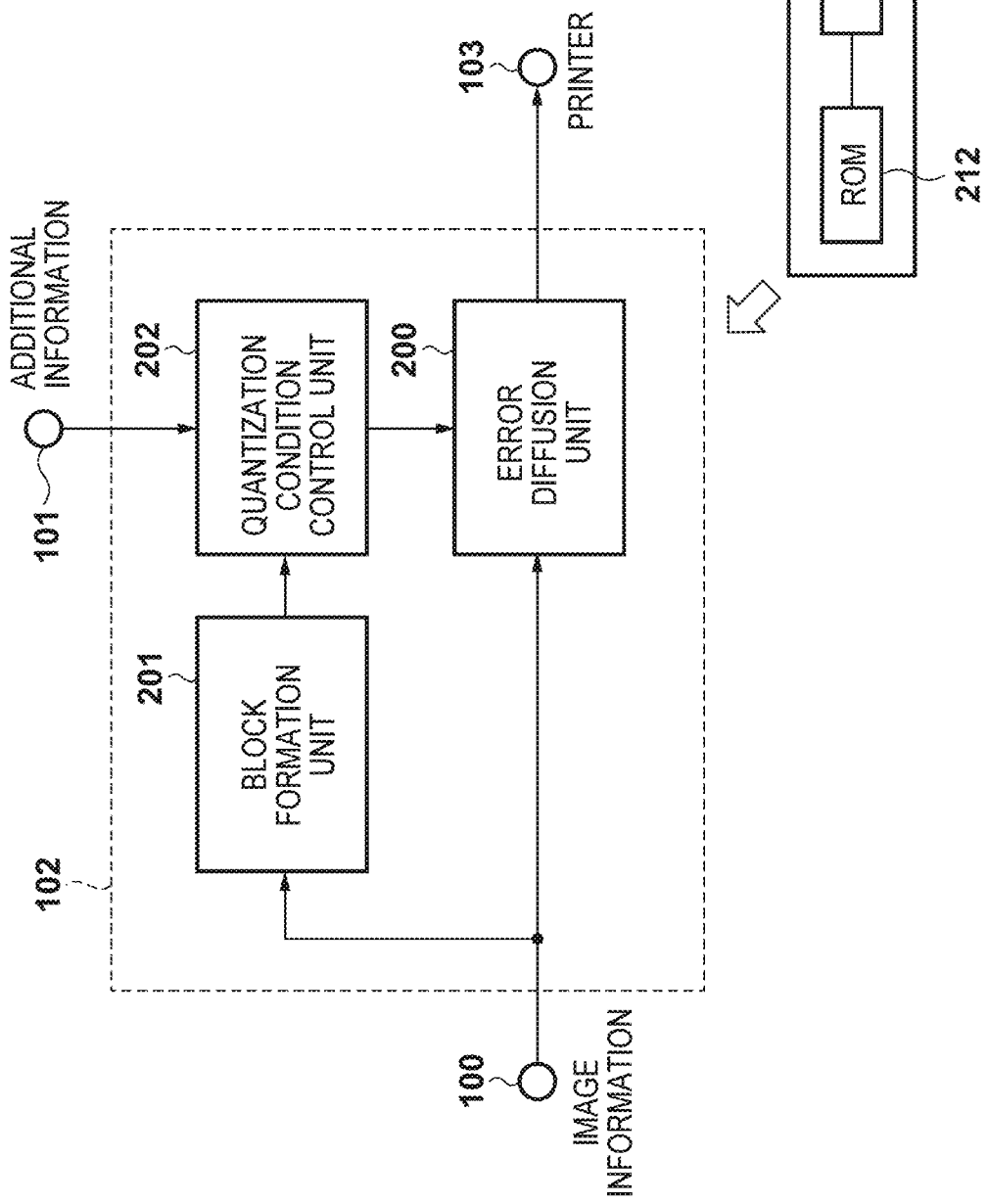
FIG. 2 is a block diagram showing the detailed arrangement of an additional information multiplexing unit 102 shown in FIG. 1.

FIG. 2 is a block diagram showing the detailed arrangement of the additional information multiplexing unit 102 shown in FIG. 1.

An error diffusion unit 200 of the additional information multiplexing unit 102 performs pseudo-halftoning using an error diffusion method to convert image information input from the input terminal 100 into a quantization level lower than the number of input tonality, thereby representing the tonality areally based on the quantized values of a plurality of pixels. Details of error diffusion processing will be described later.

A block formation unit 201 segments input image information in a predetermined area unit. Block formation performed by the block formation unit 201 may be segmentation into rectangles or areas other than rectangles. A quantization condition control unit 202 changes and controls a quantization condition in the area unit of the block formed by the block formation unit 201. The quantization condition control unit 202 controls the quantization condition for each block based on additional information input from the input terminal 101.

A control unit 210 includes a CPU 211, a ROM 212, and a RAM 213. The CPU 211 controls the operations and processes of the above-described components in accordance with control programs held in the ROM 212. The RAM 213 is used as the working area of the CPU 211.

Figure 3:
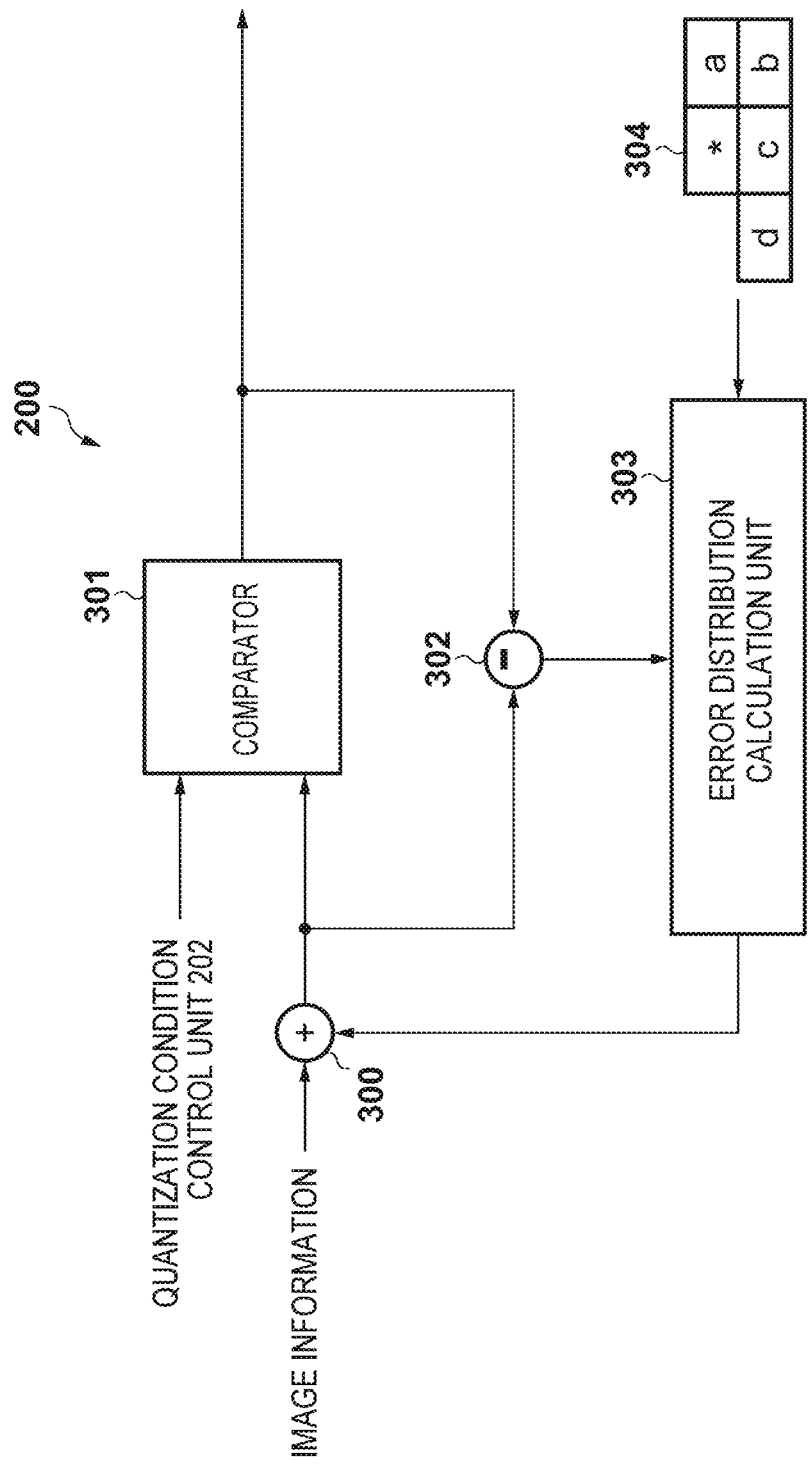
FIG. 3 is a block diagram showing details of an error diffusion unit 200.

FIG. 3 is a block diagram showing details of the error diffusion unit 200. Note that error diffusion processing is well known and a description thereof will be omitted.

Error diffusion processing in which the quantized value is binary will be exemplified.

An adder 300 adds the value of a pixel of interest of input image information and the distributed quantization error of a binarized adjacent pixel. A comparator 301 compares a quantization threshold from the quantization condition control unit 202 with an addition result of adding an error. The comparator 301 outputs "1" in a case where the addition result is larger than a predetermined threshold; otherwise, "0". For example, upon representing the pixel tonality at 8-bit accuracy, it is generally represented by a maximum value "255" and a minimum value "0".

Assume that a dot (for example, ink or toner) is printed on a print medium in a case where the quantized value is "1". A subtracter 302 calculates an error between the quantization result and the above-mentioned addition result, and distributes, based on an error distribution calculation unit 303, the error to adjacent pixels to undergo subsequent quantization processing.

A distribution table (error diffusion matrix) 304 of errors experimentally set based on a relative distance to a pixel of interest is prepared in advances for the error distribution ratio. An error is distributed based on a distribution ratio set in the distribution table 304. The distribution table 304 shown in FIG. 3 is a distribution table for four adjacent pixels, but is not limited to this.

Next, the operation procedures of entire error diffusion processing including the quantization condition control unit 202 will be explained with reference to a flowchart.

Figure 4:
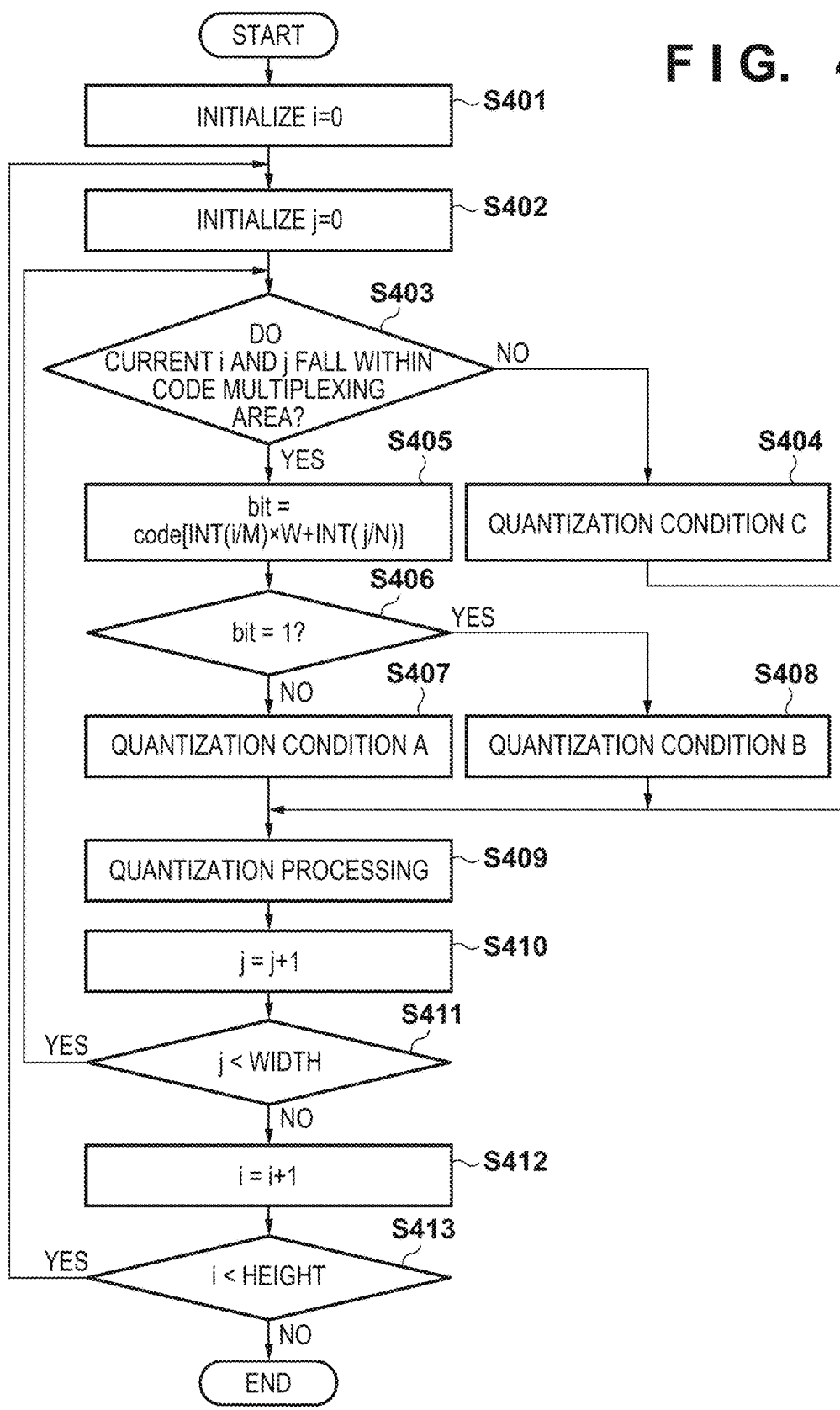
FIG. 4 is a flowchart showing an outline of entire error diffusion processing.

FIG. 4 is a flowchart showing an outline of the entire error diffusion processing. An example in which the quantized value is binary will be explained.

In step S401, a variable i is initialized to "0". The variable i is a variable for counting an address in the vertical direction. In step S402, a variable j is initialized to "0". The variable j is a variable for counting an address in the horizontal direction. In step S403, it is determined whether a coordinate point indicated by the variables (i, j) serving as the current processing address belongs to an area for which multiplexing processing should be executed.

The multiplexing area will be explained with reference to the drawing.

FIG. 5 is a view showing one image in which the horizontal pixel count is WIDTH and the vertical pixel count is HEIGHT. Assume that additional information is multiplexed on this image.

The upper left corner of the image shown in FIG. 5 is defined as an origin, and the image undergoes block formation to form rectangles each of N pixels in the lateral direction×M pixels in the longitudinal direction. Although block formation is performed using the origin as a reference point in this embodiment, a point spaced apart from the origin may be set as a reference point. Upon multiplexing maximum information in this image, blocks each of N×M pixels are arranged from the reference point. More specifically, letting W be the number of blocks that can be arranged in the horizontal direction, and H be the number of blocks that can be arranged in the vertical direction, the following relations are obtained:

$$W=\text{INT}(\text{WIDTH}/N) \quad (1)$$

$$H=\text{INT}(\text{HEIGHT}/M) \quad (2)$$

where INT( ) is the integer part in ( ).

The remainder numbers of pixels indivisible in equation (1) and equation (2) are equivalent to an end portion in a case where a plurality of blocks each of N×M pixels are arranged. This end portion serves as the outside of the code multiplexing area.

Referring back to FIG. 4, if it is determined in step S403 that the currently processed pixel of interest falls outside the multiplexing area, the process advances to step S404 to set a quantization condition C. In contrast, if it is determined that the pixel of interest falls within the multiplexing area, the process advances to step S405 to read additional information to be multiplexed. For descriptive convenience, assume that additional information is represented bit by bit using an array code[ ]. For example, assuming that additional information is 48-bit information, the array code[ ] stores respective bits in code[0] to code[47].

In step S405, information in the array code[ ] is substituted into a variable bit:

$$\text{bit}=\text{code}[\text{INT}(i/M) \times W + \text{INT}(j/N)] \quad (3)$$

Subsequently, in step S406, it is determined whether the value of the substituted variable bit is "1". As described above, information in the array code[ ] is stored bit by bit, so the value of the variable bit also indicates either "0" or "1". If it is determined in step S406 that the value of the variable bit is "0", the process advances to step S407 to set a quantization condition A. If it is determined that the value of the variable bit is "1", the process advances to step S408 to set a quantization condition B.

In step S409, quantization processing is executed based on the set quantization condition. This quantization processing is quantization processing based on the error diffusion method described with reference to FIG. 3. In step S410, the variable j in the horizontal direction is incremented by one. In step S411, it is determined whether the value of the variable j is smaller than the horizontal pixel count WIDTH of the image. The above-described processing is repeated until the processed pixel count reaches WIDTH. If it is determined that j≥WIDTH and the processing in the horizontal direction has ended for the pixel count WIDTH, the process advances to step S412 to increment the variable i in the vertical direction by one.

In step S413, it is determined whether the value of the variable i is smaller than the vertical pixel count HEIGHT of the image. The above-described processing is repeated until the processed pixel count reaches HEIGHT. If it is determined that i≥HEIGHT, the process ends.

By the above-described processing, the quantization condition can be changed for each block formed from N×M pixels.

Next, an example of the quantization conditions A, B, and C will be explained.

Although the quantization condition in the error diffusion method has various factors, the quantization condition is a quantization threshold in this embodiment. Since the quantization condition C is used outside the multiplexing area, the quantization threshold is arbitrary. As described above, in a case where the quantization level is binary in a tonality representation of 8 bits per pixel, the maximum value "255" and the minimum value "0" are quantization representative values, and an intermediate value "128" is often set as the quantization threshold. That is, the quantization condition C is a condition that the quantization threshold is fixed to "128".

Since the quantization conditions A and B are used in blocks within the multiplexing area, the difference in image quality needs to be generated in accordance with the difference between the quantization conditions. However, it is necessary that the difference in image quality needs to be represented so that it is difficult to visually discriminate the difference, but the difference has to be easily identified on a print medium.

FIGS. 6A and 6B are views showing an example of the quantization conditions A and B.

FIG. 6A is a view showing the period of a change of the quantization threshold in the quantization condition A. In FIG. 6A, one square indicates one pixel, a white square indicates a fixed threshold, and a shaded square indicates a variable threshold. That is, in the example shown in FIG. 6A, a matrix of eight pixels in the lateral direction and four pixels in the longitudinal direction is constituted, and an excessive value is set as a threshold only for a shaded square.

To the contrary, FIG. 6B is a view showing the period of a change of the quantization threshold in the quantization condition B. In the example shown in FIG. 6B, unlike FIG. 6A, a matrix of four pixels in the lateral direction and eight pixels in the longitudinal direction is constituted, and an excessive value is set as a threshold only for a shaded square.

As described above, in a case where one pixel has an 8-bit tonality value, for example, "128" is set as the fixed threshold, and "10" is set as the excessive threshold. When the quantization threshold decreases, the quantized value of a pixel of interest readily becomes "1" (quantization representative value "255"). That is, in both FIGS. 6A and 6B, the quantized values "1" are easily arranged in the arrangement of shaded squares in FIGS. 6A and 6B. In other words, blocks in which dots are generated in the arrangement of shaded squares in FIG. 6A, and blocks in which dots are generated in the arrangement of shaded squares in FIG. 6B coexist for every block of N×M pixels.

In the error diffusion method, a small change of the quantization threshold does not greatly influence the image quality. In the ordered dither method, the image quality of the tonality representation greatly depends on a dither pattern to be used. However, in the error diffusion method that regularly gives a change of the quantization threshold, the tonality representation that determines the image quality is only the error diffusion method. Thus, the arrangement of dots may slightly change, or the generation of a texture may change, which hardly influences the image quality of the tonality representation. Even in a case where the quantization threshold changes, an error serving as a difference between an image signal value and a quantized value is diffused to adjacent pixels, and the input image signal value is saved macroscopically. That is, in a case where the error diffusion method is used, redundancy is very large as for the arrangement of dots and generation of a texture.

In the above-described example, multiplexing is implemented by superimposing predetermined periodicity representing a code on a quantization threshold in the error diffusion method. However, the following methods are also conceivable:

a method of directly superimposing periodicity on brightness information of R, G, and B;

a method of dividing brightness information of R, G, and B into brightness-color difference information (for example, Y, Cr, and Cb signals), and multiplexing periodicity; and a method of dividing brightness information of R, G, and B into ink colors (for example, C, M, Y, and K signals), and multiplexing periodicity.

Next, the additional information demultiplexing unit 106 in the image processing system shown in FIG. 1 will be explained.

Figure 7:
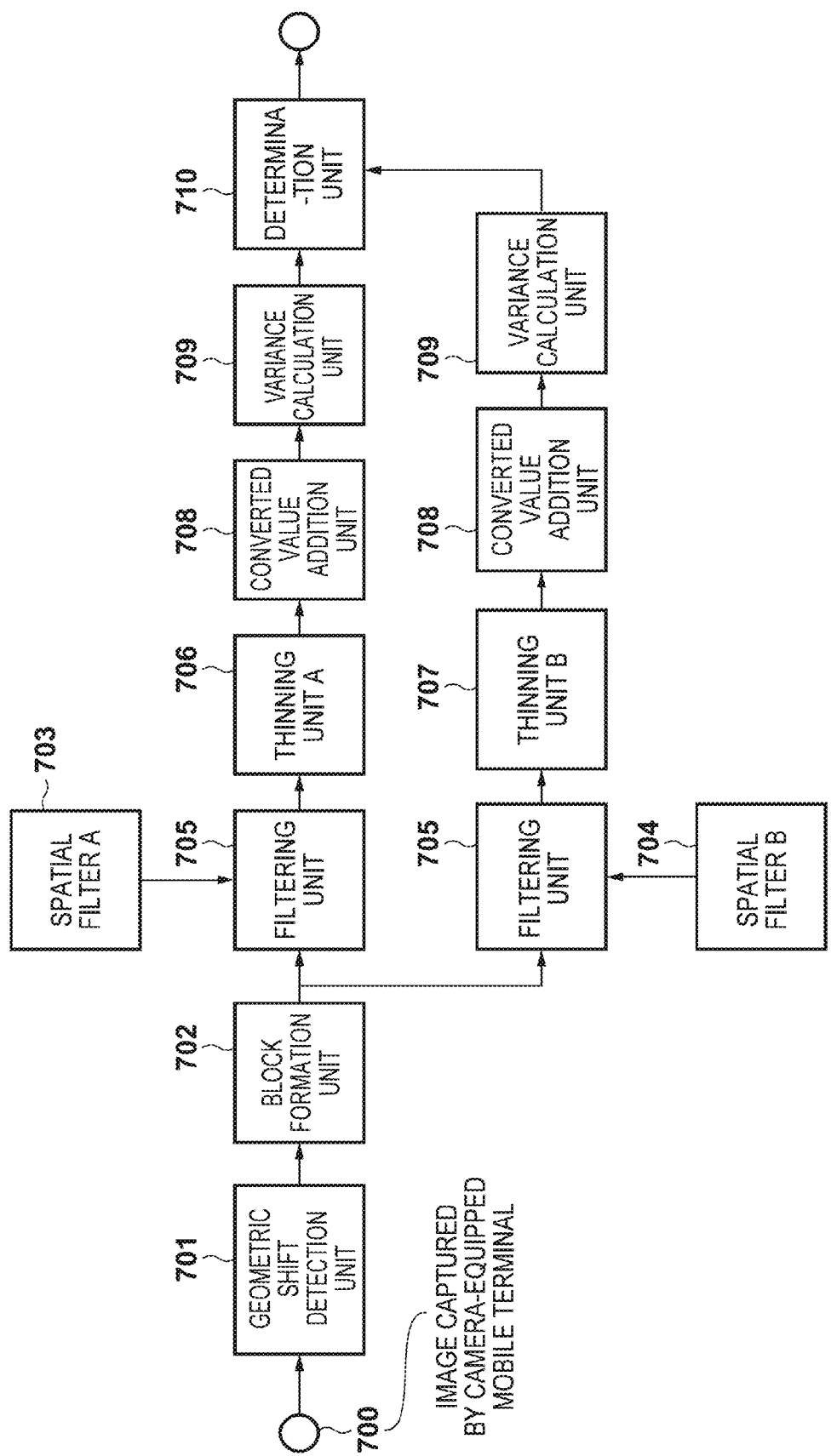
FIG. 7 is a block diagram showing the arrangement of an additional information demultiplexing unit 106.

FIG. 7 is a block diagram showing the arrangement of the additional information demultiplexing unit 106.

For descriptive convenience, an example of demultiplexing additional information from a print product in which each 1-bit additional information is multiplexed in a divided block will be explained, as in the example of the above-described additional information multiplexing unit 102. Needless to say, the additional information amount per block in the additional information multiplexing unit equals the demultiplexing information amount per block in the additional information demultiplexing unit.

As shown in FIG. 7, image information read by the camera-equipped mobile terminal 104 is input from an input terminal 700. The resolution of the image capturing sensor 105 of the camera-equipped mobile terminal 104 to be used is desirably equal to or higher than the resolution of the printer 103 that prints a print product. As a matter of course, to accurately read scattering information of dots on a print product, the resolution needs to be double or more on the image capturing sensor side than on the printer side according to the sampling theorem. However, if the resolution is equal or higher, scattering of dots can be determined to a certain degree though it may be inaccurate. This embodiment therefore assumes that the resolution of the printer and that of the image capturing sensor 105 are equal for descriptive convenience.

A geometric shift detection unit 701 detects a geometric shift of an image captured by the camera-equipped mobile terminal 104. Needless to say, image information input from the input terminal 700 sometimes geometrically greatly shifts from image information before output by the printer 103 because the image information is input after output by the printer 103 and shooting by the camera-equipped mobile terminal 104. Hence, the geometric shift detection unit 701 performs edge detection of the boundary between a print product and an image other than the print product.

FIG. 8 is a view showing the relationship with a print product included in a captured image.

If the printer resolution and the image capturing sensor resolution are equal, a large factor to be corrected is the rotation (tilt) of an image caused by, for example, a skew of a print medium that occurs at the time of printing on the print medium by the printer, or a shift occurred when the camera-equipped mobile terminal 104 is held over the print product. By detecting the boundary of the print product, the degree of rotation of the print product by which the shift occurs can be determined.

A block formation unit 702 segments an input image into blocks by every P pixels in the lateral direction and every Q pixels in the longitudinal direction. This block needs to be smaller than a block of N×M pixels at the time of superimposing a digital watermark. That is, the following relations are established:

$$P \leq N \text{ and } Q \leq M \qquad (4)$$

Block formation of every P×Q pixels is skipped and executed at every given interval. More specifically, block formation is performed so that one block of P×Q pixels is included in an area assumed to be a block formed from N×M pixels at the time of multiplexing, as shown in FIG. 8. The number of skipped pixels is basically N pixels in the horizontal direction and M pixels in the vertical direction. However, it is necessary to divide, by the number of blocks, a shift amount detected by the geometric shift detection unit 701, calculate a shift amount per block, and add the shift amount to the number of skipped pixels, thereby correcting the number of skipped pixels.

A spatial filter A 703 and spatial filter B 704 having different characteristics are connected to dedicated digital filtering units 705 that calculate the product sum of values of adjacent pixels. Each coefficient of the spatial filter is created adaptively to the period of the variable threshold of the quantization condition at the time of multiplexing.

Assume that additional information is multiplexed by using two types of periodicity in FIGS. 6A and 6B to change the quantization condition in the multiplexing unit.

FIGS. 9A and 9B are views showing examples of the spatial filter used in the additional information demultiplexing unit.

FIGS. 9A and 9B show examples of the spatial filter A 703 and spatial filter B 704 used in the additional information demultiplexing unit in a case where an image in which additional information is multiplexed by using the two types of periodicity in FIGS. 6A and 6B is input. In these drawings, the center portion of 5×5 pixels serves as a pixel of interest, and the remaining 24 pixels serve as adjacent pixels. In FIGS. 6A and 6B, pixels at blank portions represent that the filter coefficient is "0". As is apparent from these drawings, the filters shown in FIGS. 9A and 9B are edge enhancement filters. In addition, the directionality of an edge to be enhanced and the directionality of the variable threshold upon multiplexing coincide with each other. That is, the spatial filters are created so that the spatial filter in FIG. 9A coincides with the periodicity in FIG. 6A and the spatial filter in FIG. 9B coincides with the periodicity in FIG. 6B.

A thinning unit A 706 and thinning unit B 707 perform thinning processing based on given regularity on signals (to be referred to as converted values hereinafter) after filtering in a block formed from P×Q pixels. In this embodiment, the thinning regularity is separated into periodicity and phase to perform processing. More specifically, the thinning unit A 706 and the thinning unit B 707 are different from each other in thinning periodicity, and execute a plurality of thinning processes in which the phase is changed. The thinning method will be described later.

Converted values respectively thinned out by the thinning unit A 706 and the thinning unit B 707 are input to two corresponding converted value addition units 708, and added for the respective phases. The thinning processing and the converted value addition processing are equivalent to extracting power of a predetermined frequency vector enhanced by the spatial filter. Two variance calculation units 709 calculate the variances of a plurality of values added for the respective phases in the respective periodicities. A determination unit 710 determines a multiplexed code based on the variances in the respective periodicities.

FIG. 10 is a view showing an outline of the processing in a two-dimensional frequency region according to this embodiment. In FIG. 10, an abscissa fx indicates the frequency in the horizontal direction, and an ordinate fy indicates the frequency in the vertical direction. The origin serving as the center indicates a DC component, and the frequency increases as it moves apart from the origin. A circle in FIG. 10 indicates a cutoff frequency by error diffusion. The filter characteristic of the error diffusion method indicates the characteristic of an HPF (High Pass Filter) in which a low-frequency region is cut off. The frequency to be cut off changes in accordance with the density of a target image.

By changing the quantization threshold, a frequency characteristic generated after quantization changes. A large power spectrum is generated on a frequency vector A shown in FIG. 10 by a change of the quantization threshold in FIG. 6A, and on a frequency vector B shown in FIG. 10 by a change of the quantization threshold in FIG. 6B. Upon demultiplexing additional information, detection of a frequency vector on which a large power spectrum is generated leads to determination of a multiplexed signal. It is therefore necessary to individually enhance and extract respective frequency vectors.

The spatial filters shown in FIGS. 9A and 9B are equivalent to HPFs each having the directionality of a specific frequency vector. More specifically, the spatial filter shown in FIG. 9A can enhance a frequency vector on the straight line A, and the spatial filter shown in FIG. 9B can enhance a frequency vector on the straight line B.

For example, assume that a large power spectrum is generated on the frequency vector of the straight line A shown in FIG. 10 by a change of the quantization condition in FIG. 6A. At this time, the change amount of the power spectrum is amplified by the spatial filter in FIG. 9A, but is hardly amplified by the spatial filter in FIG. 9B. That is, in a case where a plurality of spatial filters perform filtering in parallel, the power spectrum is amplified only by a spatial filter coincident with the frequency vector, and is hardly amplified by other filters. Thus, a frequency vector on which a large power spectrum is generated can be easily identified.

Figure 11:
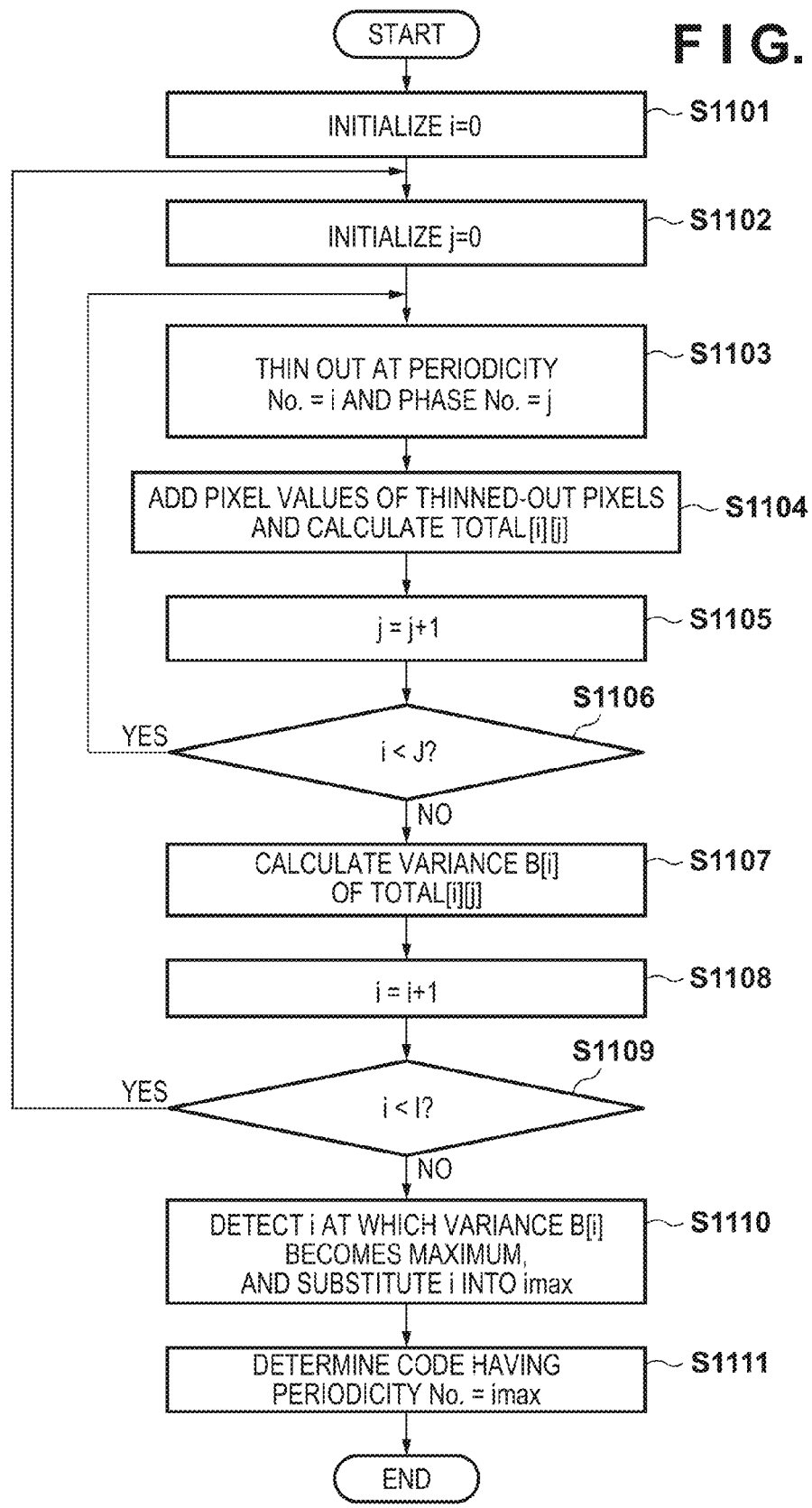
FIG. 11 is a flowchart showing an additional information decoding operation to be executed by a thinning unit A, a thinning unit B, converted value addition units, variance calculation units, and a determination unit.

FIG. 11 is a flowchart showing an operation to be executed by the thinning unit A 706, the thinning unit B 707, the converted value addition units 708, the variance calculation units 709, and the determination unit 710.

In steps S1101 and S1102, the values of the variables i and j are initialized to "0". In step S1103, factors of the thinning regularity by the thinning unit A 706 and the thinning unit B 707, that is, two factors "periodicity" and "phase" are determined. Here, i is a variable regarding the periodicity, and j is a variable regarding the phase. The conditions of the periodicity and phase are managed by the number. Thinning method factors having a periodicity number (to be referred to as No. hereinafter) of i and a phase No. of j are set.

In step S1104, converted values thinned out in a block are added, and the addition value is stored as a variable array TOTAL[i][j].

The variable j is incremented by one in step S1105, and compared with a fixed value J in step S1106. J is the number of times by which the phase is changed to perform thinning processing. J is stored in a memory or a register. If the variable j is smaller than J (j<J), the process returns to step S1103 to repeat thinning processing and thinned-out pixel addition processing for a new phase No. indicated by the incremented variable j.

To the contrary, if it is determined that j≥J and phase-shifted thinning processing and addition processing have been performed the set number of times, the process advances to step S1107 to calculate the variance of the addition result TOTAL[i][j]. That is, the degree of dispersion of respective addition results depending on the phase difference is evaluated. In this case, the i value is fixed, and the variances of J addition results TOTAL[i][j] are obtained. The variance is B[i].

The variable i is incremented by one in step S1108, and the variable i and a fixed value I are compared in step S1109. The fixed value I is the number of times by which the periodicity is changed to perform thinning processing. I is stored in a memory or a register. If the variable i is smaller than I (i<I), the process returns to step S1102 to repeat thinning processing and converted value addition processing again by using a new periodicity No. condition indicated by the value of the incremented variable i. To the contrary, if it is determined that i≥I and thinning processing and addition processing have been performed the set number of times, the process advances to step S1110. At this time, I variances B[i] have been calculated.

In step S1110, the maximum value of the variance is detected from a set of I variances, and the value of the variable i at this time is substituted into a variable imax. Finally, in step S1111, it is determined that a code having a periodicity No. of imax is a multiplexed code, and then the process ends.

Here, an example in which I=2 and J=4 will be explained. FIGS. 12 and 13 are views showing in the table format a thinning method in a case where the block size is P=Q=16. In FIGS. 12 and 13, one square in the block represents one pixel. In FIGS. 12 and 13, the block shape is P=Q=square. However, the block shape is not limited to a square and may be a rectangle in which P≠Q.

FIG. 12 shows a thinning method (equivalent to the thinning unit A 706 in FIG. 7) in a case where the periodicity No.=0. FIG. 13 shows a thinning method (equivalent to the thinning unit B 707 in FIG. 7) in a case where the periodicity No.=1. In these drawings, a value indicated by each pixel in the block represents a thinned-out pixel for the phase No.=j. For example, a pixel displayed as "0" corresponds to a thinned-out pixel for j=0. That is, there are four phases in both FIGS. 12 and 13, which are equivalent to a thinning method in a case where the phase No. is j=0 to 3.

As for the periodicities shown in FIGS. 12 and 13, the periodicity in FIG. 12 coincides with the periodicity in FIG. 6A, and the periodicity in FIG. 13 coincides with the periodicity in FIG. 6B. As described above, quantized values "1" (in the case of binary values "0" and "1") are easily arranged in the arrangement of shaded squares in both FIGS. 6A and 6B. For example, in the case of a block corresponding to the quantization condition A at the time of multiplexing, quantized values "1" are easily arranged with the periodicity of FIG. 6A, and the frequency component is further amplified at the time of a matched spatial filter. In a case where converted values are thinned out and added with the periodicity shown in FIG. 12, the variance of the addition result increases.

Compared to this, in a case where a block corresponding to the quantization condition A is filtered using an unmatched spatial filter, and thinning is executed with the periodicity shown in FIG. 13, the variance value of the addition result of converted values decreases. Since the periodicity of the quantized value and the periodicity of thinning are different, the addition values of converted values depending on the difference of the phase of thinning become average, and the variance decreases. To the contrary, in a block corresponding to the quantization condition B at the time of multiplexing, the variance is decreased by thinning shown in FIG. 12, and increased by thinning shown in FIG. 13.

In application to the above-described processing according to the flowchart shown in FIG. 4, bit=0 is set as the quantization condition A, and bit=1 is set as the quantization condition B. Thus, it can be determined that bit=0 in a case where the variance at the periodicity No.=0 is large, and bit=1 in a case where the variance at the periodicity No.=1 is large.

That is, multiplexing of additional information and demultiplexing of the additional information can be easily implemented by associating the quantization condition, the spatial filter characteristic, and the periodicity of the thinning condition.

In this embodiment, the periodicity No. takes two values of 0 and 1, and the multiplexing code in a block is 1 bit. However, the multiplexing code may be larger, as a matter of course. The type of the quantization condition, the type of the spatial filter, and the type (I value) of the periodicity No. of the thinning condition coincide with each other.

In this embodiment, the code can be easily separated without comparing the power values of frequencies corresponding to the regularities of the quantization conditions by orthogonal transformation. In addition, additional information demultiplexing processing can be implemented at very high speed because of processing in a real space domain.

Although the embodiment has been explained above, the quantization conditions A and B, the spatial filters A and B, and the thinning units A and B are merely examples, and the present invention is not limited to them. Another periodicity may be given, or the number of taps of the spatial filter, the thinning block size, and the like may be larger or smaller than those in the above-mentioned example.

The flowchart shown in FIG. 11 uses repetitive processing based on the variable i indicating the periodicity No. and the variable j indicating the phase No. in order to simply explain the concept of the present invention. In practice, however, the method of repetitive processing based on a pixel address in a block formed from P×Q pixels is easily implemented. More specifically, as shown in FIGS. 12 and 13, two types of information, that is, the periodicity No. and the phase No. are stored in advance as a table for each pixel address in the block, and converted values are added to the respective variables of the corresponding periodicity No. and phase No. According to this method, the addition values of respective sets of the periodicity No. and phase No. can be calculated in parallel by only processing P×Q pixels.

Further, in the procedures of the flowchart shown in FIG. 11, the variances of the addition results of thinned-out converted values after the spatial filter are calculated, and the code is determined by comparing the variances. However, the present invention is not limited to this. A method by a comparison based on an evaluation function without using the variance is also conceivable. The deviation of the addition results of thinned-out converted values suffices to evaluate the "degree of dispersion" because a value tends to outstand in only one phase upon shifting the phase.

For example, to evaluate the degree of dispersion, the following evaluation functions other than the variance are conceivable:

1. the difference between maximum and minimum values among addition values obtained by adding thinned-out converted values 2. either of the difference between a maximum value and a second maximum value among addition values obtained by adding thinned-out converted values, and the difference between a minimum value and a second minimum value 3. a maximum value among preceding and succeeding differences at the time of creating the histogram of addition values obtained by adding thinned-out converted values.

Although evaluation functions 1, 2, and 3 are difference values, the relative ratio of the difference value and converted value, or the sums of pixel values and converted values can also be used as an evaluation function. The quantized value is binary in the example, but is not limited to this.

As described above, according to this embodiment, the quantization condition is changed for each block formed from M×N pixels in an image, the image is quantized in accordance with the quantization condition, and predetermined information can be embedded in the image. Compared to a conventional information embedding method, for example, a method of embedding information after orthogonal transformation, the image quality deterioration can be suppressed, and information can be embedded in an image so that the embedded information can be extracted quickly with high accuracy.

Next, continuous shooting of a multiplexed print product by the camera-equipped mobile terminal 104 will be explained. In this embodiment, a case in which a large amount of data such as voice data or moving image data is added to a print product will be considered. The following explanation assumes that information is embedded in the entire print product.

When reading multiplexed information of a print product by the camera-equipped mobile terminal 104, the camera-equipped mobile terminal 104 needs to be brought close to the print product up to a distance at which the multiplexed pattern can be analyzed. However, if the multiplexed information is embedded in the entire print product, the multiplexed information in the entire range of the print product cannot be captured by one shooting owing to the reading resolution or the like. It is therefore necessary to capture the entire range separately as a plurality of images while moving the camera-equipped mobile terminal 104 above the print product. This will be called "continuous shooting" in this embodiment.

Details of continuous shooting will be explained with reference to the drawings.

Figure 14:
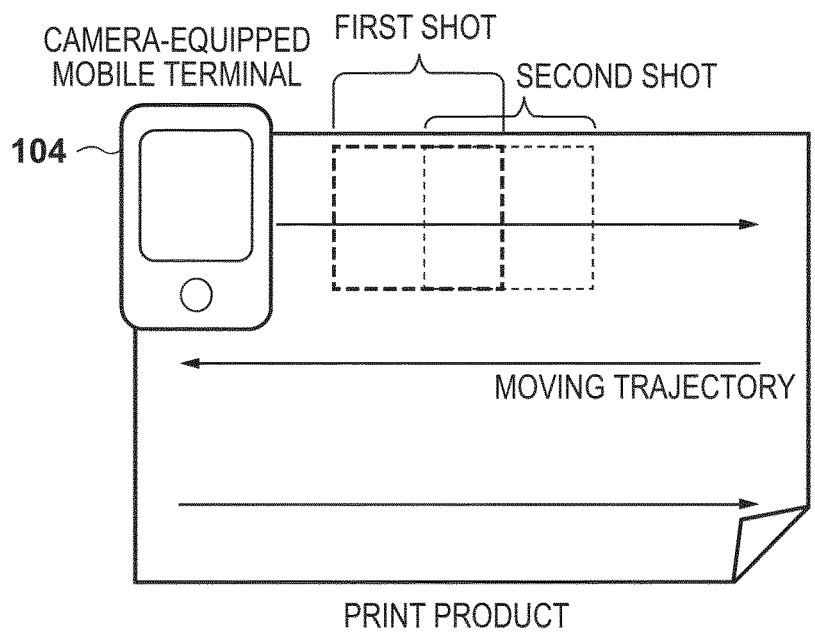
FIG. 14 is a schematic view showing the state of continuous shooting.
Figure 15:
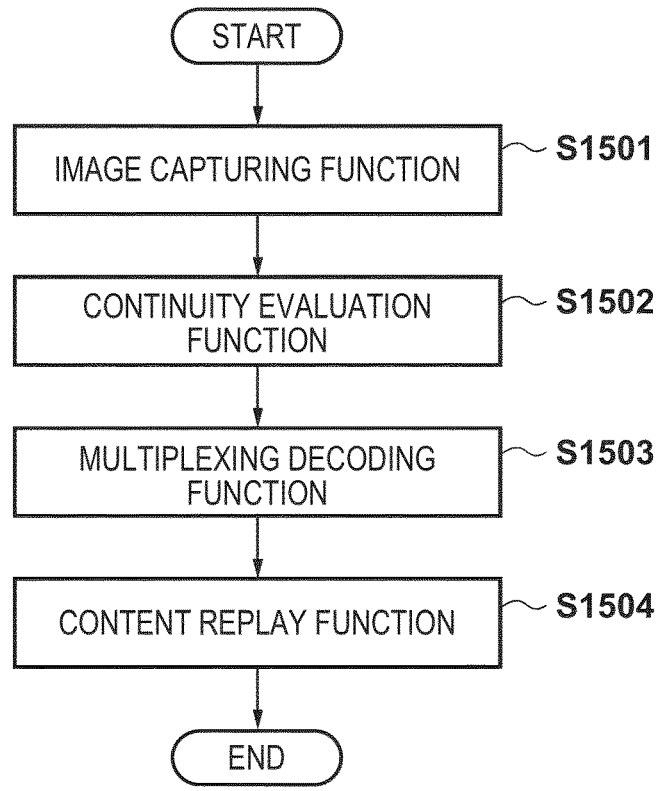
FIG. 15 is a flowchart showing processing of continuous shooting.

FIG. 14 is a schematic view showing the state of continuous shooting. FIG. 15 is a flowchart showing processing of continuous shooting.

First, the user activates a multiplexing decoding application (to be referred to as an application hereinafter) of the camera-equipped mobile terminal 104. This application has four functions in the processing order, as shown in FIG. 15. More specifically, an image capturing function of capturing a print product is executed in step S1501, and a continuity evaluation function of evaluating the continuity of a plurality of images is executed in step S1502. In step S1503, a multiplexing decoding function of reading a multiplexed pattern from an image and decoding it based on the evaluation of the continuity is executed. Finally, in step S1504, a content replay function of replaying the decoding result from the loudspeaker 108 of the camera-equipped mobile terminal 104 or displaying it on the display 109 is executed.

Then, the user positions the camera-equipped mobile terminal 104 at the upper left portion of the print product, and adjusts it to a height at which the multiplexed pattern can be read.

In this case, shooting is started by the image capturing function in step S1501, and continuous shooting is performed while moving the camera-equipped mobile terminal 104 rightward, as shown in FIG. 14. As for a range where every image is captured, a plurality of images are aligned by the continuity evaluation function in step S1502, or the shooting region is superimposed on that of a preceding image in order to compose a plurality of images into one image. In this manner, continuous shooting is performed.

In continuous shooting, if the moving speed of the camera-equipped mobile terminal 104 is excessively high, shooting may delay at a shutter speed set at the start of continuous shooting, and an omission may be occurred in the shooting region of a print product. In this case, for example, a display that instructs the user to decrease the moving speed is displayed on the display 109 of the camera-equipped mobile terminal 104. Alternatively, the moving speed is calculated from an acceleration sensor 110 of the camera-equipped mobile terminal 104 to automatically set a shutter speed corresponding to the moving speed. It is also possible to calculate an uncaptured area in a print product and display it to the user while compositing captured images.

In any case, after the end of capturing one line of the print product, as shown in FIG. 14, the camera-equipped mobile terminal 104 is moved down by one line, and continuous shooting is similarly performed while moving the camera-equipped mobile terminal 104 leftward. In this way, continuous shooting is performed to the end without any omitted range while scanning the entire range of the print product. Note that the moving direction of the camera-equipped mobile terminal 104 is not limited to one shown in FIG. 14. As long as the range in which multiplexed information is embedded is covered, the moving direction of the camera-equipped mobile terminal 104 and the size of an overlapped area are arbitrary.

After that, the continuity evaluation function in step S1502 is executed, and a plurality of captured images are aligned. By detecting the order in which images were captured, and an overlapped area in continuous images, how a plurality of captured images are connected is evaluated. By using this result, the plurality of images may be composed into one image. Composition processing to be performed here is, for example, generally known panoramic composition processing. It is also possible to calculate a moving direction and moving distance by the acceleration sensor 110 of the camera-equipped mobile terminal 104, and compose a plurality of images based on the results. A detailed processing method will be described later.

Then, the multiplexing decoding function in step S1503 is executed, and embedded multiplexed information is decoded from the continuity-evaluated image. Details of the decoding processing have already been explained with reference to FIG. 7, and a description thereof will not be repeated. Even if the continuity of a plurality of images is evaluated in step S1502, multiplexed information may not be read correctly in step S1503. In this case, a message that the image capturing function in step S1501 is executed again to perform continuous shooting is displayed on the display 109 of the camera-equipped mobile terminal 104, thereby prompting the user to perform reshooting.

Finally, in step S1504, the content replay function is executed to replay the decoded additional information by the camera-equipped mobile terminal 104. The content is a file that can be opened by the camera-equipped mobile terminal 104, such as voice data, moving image data, image data, a link on the Internet, or text data. However, the type of the file is arbitrary. For example, if multiplexed information embedded in a print product is moving image data, the moving image data is replayed in step S1504, or another moving image replay application stored in the camera-equipped mobile terminal 104 is linked to replay the moving image data.

In continuous shooting, shooting may be performed in a continuous shooting mode for still images, or after shooting in a moving image mode, frames may be extracted one by one to divide the moving image as image data. A case has been explained, in which in step S1501, the application obtains a calculation result from the acceleration sensor 110, instructs the image capturing sensor 105 about an image capturing condition based on the results, and obtains a plurality of captured images. However, shooting may be performed not by the camera function of the camera-equipped mobile terminal 104 but by a digital still camera (image capturing device). In this case, a plurality of continuously captured images are loaded into a personal computer or the like, the multiplexing decoding application is activated on the OS of the personal computer, and the plurality of loaded images are composed and decoded.

Next, embodiments will be explained, in which the image processing system having the above-described arrangement, particularly the camera-equipped mobile terminal accurately reads and decodes additional information printed on a print medium without generating out-of-focus by continuous shooting.

First Embodiment (Focus Bracket Shooting)

An example in which focus bracket shooting of performing continuous shooting at different focal lengths is performed repetitively a plurality of times will be explained.

Figure 16:
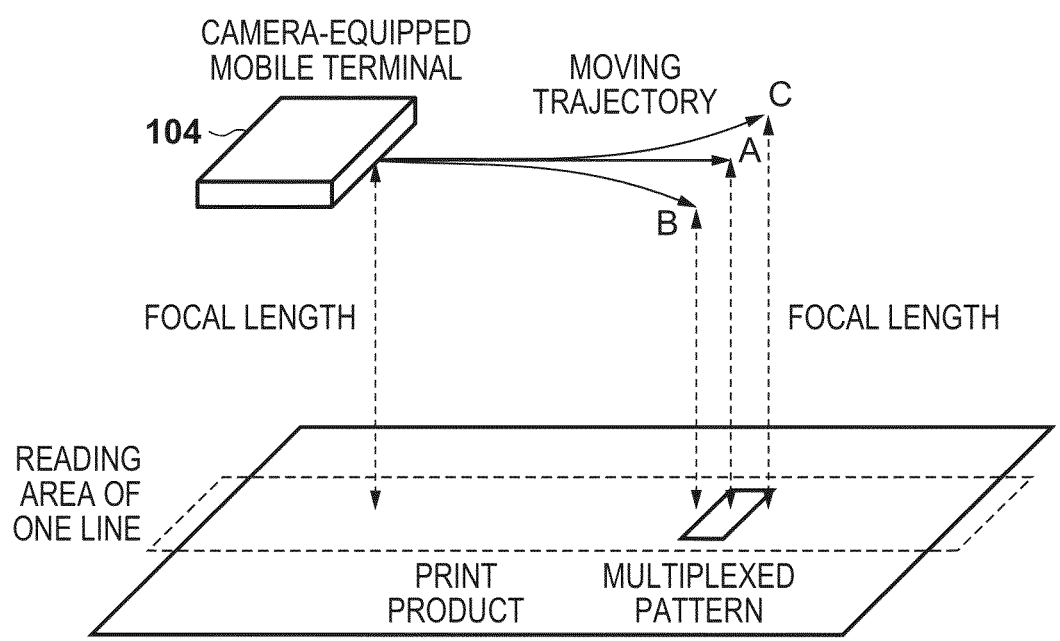
FIG. 16 is a view showing a state in which a plurality of images are continuously captured while a camera-equipped mobile terminal is held over a print product and moved in the horizontal direction.

FIG. 16 is a view showing a state in which a plurality of images are continuously captured while a camera-equipped mobile terminal 104 is held over a print product and moved in the horizontal direction.

First, the user activates the multiplexing decoding application of the camera-equipped mobile terminal 104 and executes the image capturing function. At this time, an image capturing condition is set in the camera-equipped mobile terminal 104 so as to perform continuous shooting of the print product by focus bracket shooting. Then, the user holds the camera-equipped mobile terminal 104 over an end (left end of the print product in FIG. 16) of the print product and positions it at a height at which the camera-equipped mobile terminal 104 is focused on the print product. At this time, the focus of the camera is adjusted to be able to read additional information from the print product by the image capturing function. In this case, a captured image may be temporarily decoded by the image capturing function to confirm that the additional information can be read. Alternatively, when a captured image reaches a preset edge amount, it may be determined that the camera is focused. Alternatively, if the camera is focused and additional information is successfully decoded, a message may be displayed or an alarm may be output to notify the user that the camera-equipped mobile terminal 104 is in focus.

Subsequently, the user reads one line of the print product by continuous shooting while moving the camera-equipped mobile terminal 104 to the opposite end (right end in FIG. 16) of the print product. At this time, the image capturing function may start continuous shooting when the message is displayed. It is also possible that an acceleration sensor 110 integrated in the camera-equipped mobile terminal 104 detects that the movement of the camera-equipped mobile terminal 104 has started, and then continuous shooting is started. In any case, it is very cumbersome that the user adjusts the position in every shooting and presses the shutter every time. It is therefore desirable that the camera-equipped mobile terminal 104 automatically performs continuous shooting.

When the user manually moves the camera-equipped mobile terminal 104, the first focal length cannot be maintained and, for example, the camera-equipped mobile terminal 104 may come close to the print product, as indicated by a moving trajectory B, or may move apart, as indicated by a moving trajectory C, as shown in FIG. 16. The focal length of a moving trajectory A is the same as the focal length at the start of continuous shooting, as indicated by a dotted arrow in FIG. 16. However, the focal length of the moving trajectory B is smaller than that of the moving trajectory A, and the focal length of the moving trajectory C is larger than that of the moving trajectory A.

Upon performing the above-described continuous shooting, shooting is automatically continuously performed without pressing the shutter button by the user in every shooting. In this case, continuous shooting is sometimes performed while maintaining a focal length set at the time of shooting, without using a function of adjusting the focal length by measuring a distance between an image capturing device and a print product in every shooting. In this case, if the distance between the image capturing device and the print product varies during continuous shooting, as shown in FIG. 16, shooting is performed at a setting at which the focal length is improper. To cope with the variation of the focal length, focus bracket shooting is performed at the time of continuous shooting in this embodiment. Focus bracket shooting is continuous shooting using different focal lengths. Here, focus bracket shooting is performed repetitively a plurality of times. As will be described later, an in-focus image of a print product is selected from a plurality of images obtained by focus bracket shooting, and additional information is extracted from this image. Even when the user performs shooting while moving the image capturing device, and the distance between the image capturing device and the print product changes, as shown in FIG. 16, additional information can be extracted from an in-focus proper image. This will be explained in detail below.

Figure 17:
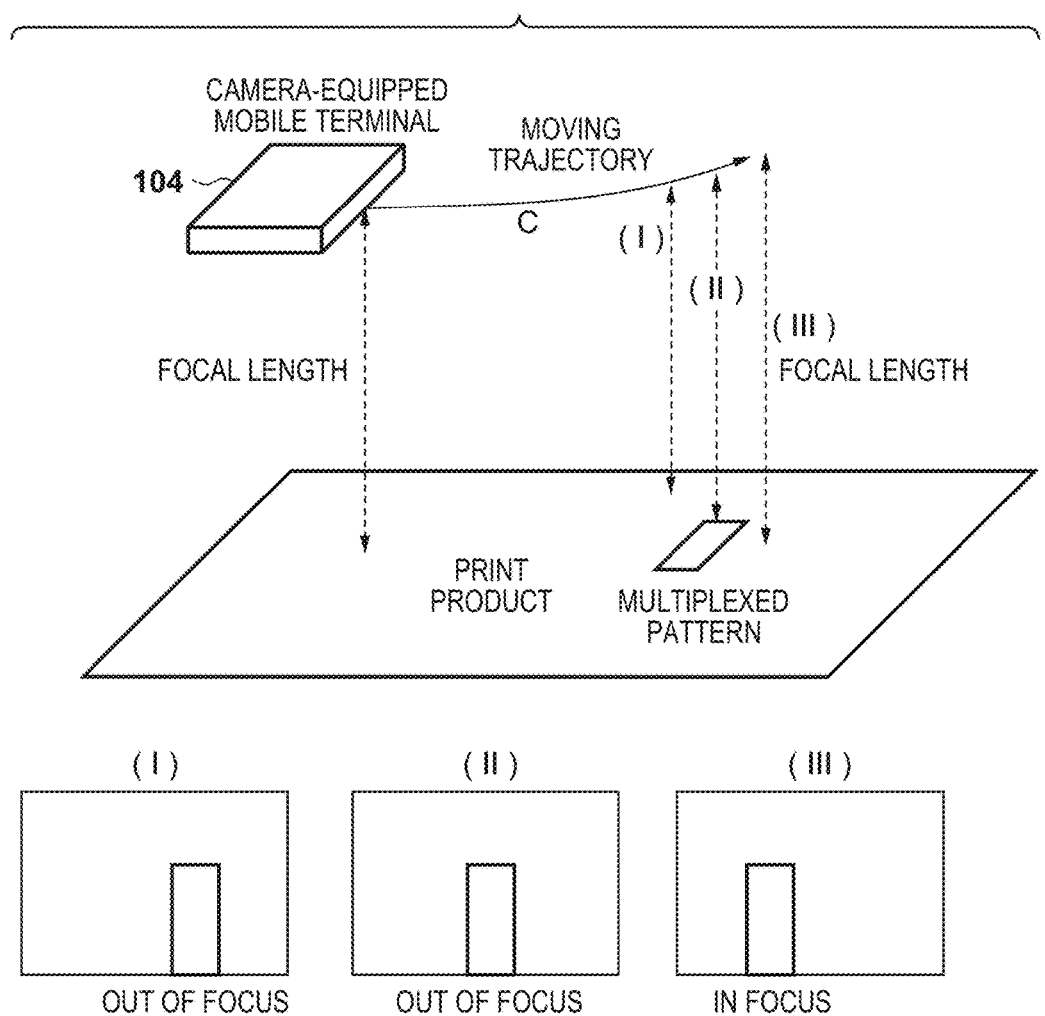
FIG. 17 is a view showing the relationship between the variation of the focal length and the focus state when continuous shooting is performed by focus bracket shooting.

FIG. 17 is a view showing the relationship between the variation of the focal length and the focus state.

A focal length to a print product on a moving trajectory C shown in FIG. 17 becomes larger than a focal length at the start of continuous shooting, so the camera-equipped mobile terminal 104 is not focused on the print product. In this embodiment, three focal lengths, that is, a focal length (II) at the start of continuous shooting, a smaller focal length (I), and a larger focal length (III) are set, and three images are almost simultaneously captured. Three dotted arrows (I) to (III) on the moving trajectory C indicate these three focal lengths.

The dotted arrow (II) indicates the focal length adjusted at the start of continuous shooting, the dotted arrow (I) indicates a focal length at which the focus is set close, and the dotted arrow (III) indicates a focal length at which the focus is set apart. The image selection criterion is an image obtained at a best focal length. In this drawing, an image in which the multiplexed pattern of the print product is in best focus is (III) at the large focal length. Thus, the image (III) is selected as an image from which digital watermark information is obtained.

By performing focus bracket shooting at the time of continuous shooting in this manner, it becomes easy to obtain an in-focus image, compared to a case in which shooting is performed at a fixed focal length.

After that, an image from which additional information can be decoded needs to be selected or generated from a plurality of images captured at almost the same position. As a method for this, the embodiment will explain the following two methods.

(1) First Method

The first method is a method of selecting one image in best focus from three images (I) to (III) captured by focus bracket shooting. In this method, the degree of edge of the entire image is detected from each image, and one image having a largest edge amount is selected. If additional information can be obtained from the image, this image is selected.

In the example shown in FIG. 17, the image (III) is in best focus, has a largest edge amount, and is thus selected. Many well-known techniques have been proposed for calculation of the edge amount, and a description thereof will be omitted. In a case where the edge amounts of all the images (I) to (III) are small, or even in a case where the edge amounts are large, if additional information can neither be read nor decoded, an error message is displayed on a display 109 of the camera-equipped mobile terminal 104. The user captures again an unread portion, and the entire range of the print product can be completely decoded.

(2) Second Method

The second method is a method of performing super-resolution processing from a plurality of images obtained by focus bracket shooting. According to this method, super-resolution processing is executed using a plurality of images corresponding to slightly shifted shooting angles of view (phases) with respect to an object.

FIGS. 18A to 18C are graphs for explaining the mechanism of super-resolution processing.

In FIG. 18A, a solid line spatially indicates a brightness change of an object. In a case where the object is captured at a sampling interval indicated by A (filled circles) in FIG. 18A, the image has signal values as shown in FIG. 18B. Only by sampling the signal values (filled circles), the brightness change of the object becomes one indicated by a solid line in FIG. 18B, and the signal value profile differs from that of the original object. In contrast, in a case where the object is captured at a sampling interval indicated by B (open circles) in FIG. 18A, the image has signal values as shown in FIG. 18C. Only by these signal values (open circles), the brightness change of the object becomes one indicated by a solid line in FIG. 18C, and the signal values also differ from those of the original object.

In other words, in both FIGS. 18B and 18C, the object is out of focus and images are captured at a rough resolution. However, the sampled images obtained at sampling intervals shifted by a half phase in FIGS. 18B and 18C are superimposed to double the resolution, and the original object as shown in FIG. 18A can be restored. This is generally called super-resolution processing. This processing method is effective upon restoring an out-of-focus image.

Referring back to FIG. 17, the image (I) is the first image captured by focus bracket shooting, the focal length from the print product is set to be smallest, and the multiplexed pattern serving as the object is positioned on the slightly right side of the image. The image (II) is the second image captured by focus bracket shooting, and the focal length is a focal length at the start of continuous shooting. Since the camera-equipped mobile terminal 104 moves rightward, the multiplexed pattern serving as the object is positioned at the center of the image. Finally, the image (III) is the third image captured by focus bracket shooting, the focal length from the print product is set to be largest, and the multiplexed pattern serving as the object is positioned on the slightly left side of the image.

For example, assume that an accurate focal length exists between (I) and (II) and all the three images are out of focus. Even in this case, the resolution of the superimposed image can be increased by performing super-resolution processing as shown in FIGS. 18A to 18C. As a result, the multiplexed pattern that is difficult to read only from the image (I) is restored at high resolution, and it becomes easy to decode additional information.

Upon superimposing the three images (I) to (III), alignment of the object is necessary. In this embodiment, the three images are aligned using the acceleration sensor 110 integrated in the camera-equipped mobile terminal 104. The acceleration sensor 110 can measure accelerations of the camera-equipped mobile terminal 104 in the horizontal and vertical directions. Accordingly, the moving direction, acceleration, current speed, and the like of the camera-equipped mobile terminal 104 can be calculated.

In FIG. 17, the distance interval upon capturing the images (I) to (III) shown in FIG. 17 can be calculated from the continuous shooting interval of focus bracket shooting and values measured by the acceleration sensor 110. Based on the calculation results, the three images are aligned and superimposed into an image having high resolution, as shown in FIGS. 18A to 18C. Super-resolution processing can therefore be performed without performing image analysis to detect edges in images and align the images, as in a conventional method.

This embodiment has explained an example in which adjacent images among a plurality of continuously captured images are aligned to evaluate the continuity, and then the multiplexed pattern of the entire print product is decoded. In addition to this continuity evaluation, a method of detecting the edges of respective images, obtaining feature amounts, aligning the images, and composing them into one image, like generally known panoramic composition, may be used, as a matter of course.

Finally, setting of the amplitude of focus bracket shooting will be explained by exemplifying two methods.

(1) Method Using Acceleration Sensor 110 of Camera-Equipped Mobile Terminal 104

In this method, a shift amount upon moving the camera-equipped mobile terminal 104, especially, a shift amount in the vertical direction (direction along the focal length shown in FIG. 17) that corresponds to a distance between the camera-equipped mobile terminal 104 and a print product is sequentially detected from the acceleration sensor 110. Based on a detection result immediately before shooting, a distance to the print product at the start of continuous shooting and a current distance to the print product are estimated, and the amplitude of bracket shooting is set in accordance with the estimation results. For example, if the camera-equipped mobile terminal 104 moves apart from the print product during continuous shooting, as shown in FIG. 17, a focal length calculated from a value measured by the acceleration sensor 110 is set for the image (III). The focal length for the image (I) is small in FIG. 17, but if the camera-equipped mobile terminal 104 moves apart from the print product, the focal length is set to be larger than that for the image (III). Accordingly, the distance by which the camera-equipped mobile terminal 104 has been moved can be detected to dynamically set the amplitude to be an optimal value.

(2) Method of Performing Continuous Shooting Plurality of Times

In this method, many users actually perform continuous shooting of, for example, a print product of A4 paper several times. The difference between a focal length at the start of continuous shooting and a focal length upon moving the camera-equipped mobile terminal 104 to the right end of the print product, as shown in FIG. 17, is measured. By calculating the average value of shifts of the focal length or the like, the tendency with which each user moves the image capturing device up or down at the time of continuous shooting is estimated, and an amplitude coping with this is set as a fixed value.

It is also possible to give a learning function in an additional information demultiplexing unit 106, and statistically set the amplitude of focus bracket shooting from a value measured by the acceleration sensor 110. When the user performs continuous shooting, values measured by the acceleration sensor 110 are recorded as needed, the statistical values of shift amounts are obtained, and the average value or maximum value of the statistical values is set as the amplitude.

The above-described two methods are performed while the continuity evaluation function in step S1502 shown in FIG. 15 is executed.

According to the above-described embodiment, while the focal length is changed in a plurality of steps, the same print product is continuously captured, and the obtained images are aligned or composed. Further, by performing super-resolution processing, a multiplexed pattern can be accurately read to accurately decode additional information of the print product.

In this embodiment, while the image capturing device is moved, continuous shooting in focus bracket shooting is repeated to capture a plurality of images. An in-focus image is selected from the plurality of images captured in each focus bracket shooting. In a case where, for example, the user moves the image capturing device quickly, no overlap may exist between thus-selected images. In this case, an omission occurs in additional information on the print product. For example, in a case where an image captured first in given focus bracket shooting and an image captured finally in the next focus bracket shooting are selected, the distance between the shooting positions is large. In this case, the omission may occur.

To prevent this, for example, the moving speed of the image capturing device is measured by the acceleration sensor 110, and in a case where the moving speed is equal to or higher than a predetermined speed, the user may be notified of this by using the display 109 or the like. Not in focus bracket shooting, but in normal continuous shooting, if the image capturing device is moved quickly, the above-mentioned image omission occurs, so the same notification may be made even in normal continuous shooting. However, since image selection is performed in focus bracket shooting, as described above, the image omission is highly likely to occur, compared to normal continuous shooting. In focus bracket shooting, therefore, a lower speed than in normal continuous shooting may be set as a predetermined speed used in the speed determination.

Second Embodiment (F-Number Bracket Shooting)

The first embodiment has explained that continuous shooting is executed while performing focus bracket shooting. At this time, images in which a print product is in focus are obtained, and a plurality of images undergo super-resolution processing and are converted into an image from which additional information can be easily decoded. In the second embodiment, it is set to perform continuous shooting by F-number bracket shooting as an image capturing condition in a camera-equipped mobile terminal 104.

A continuous shooting method by F-number bracket shooting will be described.

The depth of field of the camera becomes deep as the F-number is increased, and shallow as the F-number is decreased. If the depth of field is deep, the camera is easily focused on an object even when a camera shake occurs and the distance between the object and the camera changes. In contrast, if the depth of field is shallow, the object becomes out of focus by even a small camera shake. In terms of preventing out-of-focus caused by a camera shake, it is desirable that the depth of field is deep, that is, the F-number is increased to perform shooting. However, if the F-number is excessively increased, the light amount decreases, and the brightness of a captured image may decrease depending on the lens performance of the camera. In this case, multiplexed additional information cannot be read.

In the first place, in continuous shooting, the shutter speed needs to be increased in order to perform shooting while moving the camera-equipped mobile terminal 104. As a result, a captured image may become dark. That is, if the F-number is increased, the shutter speed is increased, and continuous shooting is performed, the light amount becomes insufficient and a captured image becomes dark. If the light amount becomes small, it becomes difficult to read the signal value of the multiplexed pattern, and noise of the image capturing element readily stands out. That is, the S/N ratio decreases.

Considering this, F-number bracket shooting is performed in this embodiment.

FIG. 19 is a view showing the relationship between the variation of the focal length and the focus state in a case where F-number bracket shooting is performed according to the second embodiment. As described in the first embodiment with reference to FIG. 17, the camera-equipped mobile terminal 104 is positioned at the left end of a print product and focused. Then, while moving the camera-equipped mobile terminal 104 rightward, continuous shooting is performed.

At this time, if the user holds the camera-equipped mobile terminal 104 by the hand and moves it, he cannot keep constant the distance between the camera-equipped mobile terminal 104 and the print product, and may bring the camera-equipped mobile terminal 104 close to or apart from the print product.

FIG. 19 shows an example in which the camera-equipped mobile terminal 104 moves apart from the print product. In this situation, upon performing continuous shooting, F-number bracket shooting is performed in this embodiment. More specifically, a plurality of images at different depths of field can be obtained by shooting while switching over the F-number in a plurality of steps. In this embodiment, shooting is performed at three F-numbers. Depths of field and captured images are represented by images (I) to (III) in FIG. 19.

As described above, if the F-number is large, the light amount becomes insufficient, a captured image becomes dark, and the S/N ratio decreases. As shown at the lower part of FIG. 19, the captured image (III) at a deepest depth of field becomes an image for which the light amount is smallest, compared to the remaining two images. That is, even if the F-number is increased to deepen the depth of field and focus the camera-equipped mobile terminal 104, a captured image becomes dark, the S/N ratio decreases, no multiplexed pattern can be read, and no additional information can be decoded. To the contrary, even if the F-number is decreased to brighten a captured image, if the depth of field is shallow and the camera-equipped mobile terminal 104 cannot be focused, no multiplexed pattern can be read, and no additional information can be decoded. In this embodiment, therefore, shooting is performed while switching over the F-number in a plurality of steps, and an image that is in best focus and has a highest S/N ratio is selected from a plurality of captured images.

By performing F-number bracket shooting, three images at different depths of field are obtained almost simultaneously by bracket shooting. Of these images, one image which is in best focus and from which a multiplexed pattern can be decoded is selected. In this selection method, as described in the first embodiment, the edge amounts of images are calculated, an image having a largest edge amount is selected and undergoes multiplexing decoding, and if additional information is successfully extracted, the image is selected. If the S/N ratio of the captured image is small and decoding of the multiplexed pattern fails, an image having the next largest edge amount is selected, and the same processing is performed.

In the example shown in FIG. 19, assume that the image (III) is in best focus, but the F-number is large, the captured image is dark, and multiplexing decoding fails. In this case, the next in-focus image (II) undergoes multiplexing decoding. The image (II) is larger in light amount and higher in S/N ratio than the image (III). If multiplexing decoding succeeds, the image (II) is selected, and the continuity evaluation function is executed to evaluate the continuity with an adjacent image. Various other well-known techniques are proposed for this selection processing, and the method is arbitrary.

In a case where F-number bracket shooting is performed in the above-described way and one easiest-decoding image is selected in every shooting, the brightnesses of adjacent images may vary. In conventional panoramic composition processing, a plurality of adjacent images cannot be composed as a photograph unless their brightnesses coincide with each other. However, since the purpose of this embodiment is to read a multiplexed pattern embedded in a print product, the brightnesses of continuously captured adjacent images need not coincide with each other. That is, a captured image at the start of continuous shooting may be an image having the brightness of the in-focus image (I), and an image captured after movement may be an image having the brightness of the in-focus image (II). If these images are aligned or composed and a multiplexed pattern is successfully read, it does not matter whether the brightnesses of a plurality of images coincide with each other. In this embodiment, processing of adjusting the brightness so that the brightnesses of images coincide with each other is not performed, so processing can be simplified.

As described in the first embodiment, super-resolution processing may be performed using a plurality of images obtained by bracket shooting even in the second embodiment.

The images (I) to (III) shown in FIG. 19 are three images obtained by F-number bracket shooting while moving the camera-equipped mobile terminal 104 rightward. Thus, the phase of the multiplexed pattern serving as the object shifts in every image. As described with reference to FIGS. 18A to 18C, a high-resolution composed image can be generated by performing super-resolution processing for a plurality of phase-shifted images. As a result, the multiplexed pattern that is difficult to read from only the image (I) is restored, and additional information can be easily decoded.

By performing super-resolution processing even in this embodiment, the resolution of the multiplexed pattern can be increased to increase the signal value (S value). Since phase-shifted images are superimposed, noise (N value) of an image capturing sensor 105 can be smoothed, thereby increasing the S/N ratio.

Even in this embodiment, upon superimposing the three images (I) to (III), the three images are aligned using an acceleration sensor 110 of the camera-equipped mobile terminal 104.

Setting of the amplitude of F-number bracket shooting will be explained by giving three examples.

(1) First Example

This example is a method using the acceleration sensor 110 of the camera-equipped mobile terminal 104, as in the first embodiment.

A shift amount upon moving the camera-equipped mobile terminal 104, especially, a shift amount in the vertical direction (direction along the focal length shown in FIG. 19) in which the distance between the camera-equipped mobile terminal 104 and a print product is measured is sequentially detected from the acceleration sensor 110. Based on a detection result immediately before shooting, a distance to the print product at the start of continuous shooting and a current distance to the print product are estimated, and the amplitude of bracket shooting is set in accordance with the estimation results.

For example, if the camera-equipped mobile terminal 104 moves apart from the print product during continuous shooting, as represented by a moving trajectory indicated by a solid arrow in FIG. 19, a depth of field, that is, an F-number calculated from a value measured by the acceleration sensor 110 is set for the image (III). The depth of field for the image (I) is shallow in FIG. 19, and if the camera-equipped mobile terminal 104 moves apart from the print product, a deeper depth of field, that is, a larger F-number than that for the image (III) is set. With this setting, the moving distance of the camera-equipped mobile terminal 104 can be detected to dynamically set the amplitude to be an optimal value.

(2) Second Example

In this example, as in the first embodiment, many users actually perform continuous shooting of, for example, a print product of A4 paper several times. The difference between a distance to the print product at the start of continuous shooting and a distance to the print product upon moving the camera-equipped mobile terminal 104 to the right end of the print product, as shown in FIG. 19, is measured. The average value of shifts of the distance to the print product or the like during continuous shooting is calculated, and an amplitude coping with the average value or the like is set as a fixed value. It is also possible to give a learning function in an additional information demultiplexing unit 106, and statistically set the amplitude of F-number bracket shooting from a value measured by the acceleration sensor 110. When the user performs continuous shooting, values measured by the acceleration sensor 110 are recorded as needed, the statistical values of shift amounts are obtained, and the average value or maximum value of the statistical values is set as the amplitude.

(3) Third Example

In this example, the degree by which the brightness of the background area of a print product is decreased, or the degree by which the brightness of the black ink areas of a print product is increased to read a multiplexed pattern is set in advance for each camera-equipped mobile terminal 104. It is set to change the F-number as maximum as possible within the range of the upper limit value and lower limit value of the brightness.

The three examples described above are performed while the continuity evaluation function is executed in step S1502 of FIG. 15.

According to the above-described embodiment, while the F-number is changed in a plurality of steps, the same print product is continuously captured, and the obtained images are aligned or composed. Further, by performing super-resolution processing, a multiplexed pattern can be accurately read to accurately decode additional information of the print product.

Third Embodiment (Shutter Speed Bracket Shooting)

An embodiment of shutter speed bracket shooting will be explained. Upon executing the image capturing function in step S1501, the user sets shutter speed bracket shooting as an image capturing condition in a camera-equipped mobile terminal 104. As described above, in a case where the shutter speed is set to be high, even if a slight camera shake occurs in continuous shooting, the blur amount can be suppressed to perform shooting. However, the light amount becomes insufficient, and a captured image becomes dark. Hence, shutter speed bracket shooting is performed. Even in this method, as in the second embodiment (FIG. 19), images from which a multiplexed pattern can be most easily decoded are superimposed based on the blur amounts of captured images and the light amount.

Referring to FIG. 19, the user positions the camera-equipped mobile terminal 104 at the left end of a print product and focuses it. Then, while moving the camera-equipped mobile terminal 104 rightward, the user performs continuous shooting. At this time, if the user holds the camera-equipped mobile terminal 104 by the hand and moves it, the distance between the camera-equipped mobile terminal 104 and the print product may change, or the moving speed may increase to blur the multiplexed pattern. In this situation, upon performing continuous shooting, shutter speed bracket shooting is performed in this embodiment. By capturing images of a print product while switching over the shutter speed in a plurality of steps, a plurality of images in different camera shake amounts can be obtained. In this embodiment, shooting is performed at three shutter speeds.

As described above, if the shutter speed is high, the light amount becomes insufficient, a captured image becomes dark, and the S/N ratio decreases. Even if the shutter speed is increased to suppress a blur amount caused by a camera shake, a captured image becomes dark, the S/N ratio decreases, no multiplexed pattern can be read, and no additional information can be decoded. To the contrary, even if the shutter speed is decreased to brighten a captured image, if the blur amount caused by a camera shake is large, no multiplexed pattern can be read, and no additional information can be decoded.

In this embodiment, shooting is performed while switching over the shutter speed in a plurality of steps, thereby generating, from a plurality of captured images, an image in which the blur amount caused by a camera shake is smallest and the S/N ratio is highest. In a method of decoding a multiplexed pattern from a plurality of captured images, one optimal image may be selected from the plurality of captured images, or super-resolution processing may be performed. Details of this are the same as those described in the second embodiment.

The method of setting the amplitude of shutter speed bracket shooting is the same as that described in the first embodiment. It is only necessary to detect shift amounts upon movement, as needed, by using an acceleration sensor 110 of the camera-equipped mobile terminal 104, and set the amplitude of bracket shooting in accordance with the result. Alternatively, the amplitude may be set as a fixed value from the statistical values of many users.

These methods are performed while the continuity evaluation function is executed in step S1502 of FIG. 15.

According to the above-described embodiment, while the shutter speed is changed in a plurality of steps, the same print product is continuously captured, and the obtained images are aligned or composed. Further, by performing super-resolution processing, a multiplexed pattern can be accurately read to accurately decode additional information of the print product.

Other Embodiments

The first to third embodiments have explained an example in which bracket shooting is performed based on one of the focus, F-number, and shutter speed upon performing continuous shooting by the camera-equipped mobile terminal 104. These embodiments have also described that the amplitude of each bracket shooting is set based on a value measured by the acceleration sensor 110. Here, an example will be explained, in which the type of bracket shooting is switched over in accordance with a value measured by an acceleration sensor 110.

For example, in a case where a camera-equipped mobile terminal 104 is greatly moved in the direction of the distance to a print product, it is sometimes focused more easily by F-number bracket shooting than by focus bracket shooting because the depth of field is deep. In this case, even if focus bracket shooting is performed at the start of continuous shooting, if a camera shake occurs greatly by a predetermined threshold or more, focus bracket shooting may be switched over to F-number bracket shooting to perform continuous shooting. When the camera-equipped mobile terminal 104 is greatly moved in its moving direction (horizontal direction with respect to a print product), a shake occurs by the horizontal movement. In this case, bracket shooting may be switched over to shutter speed bracket shooting. In this manner, the type of bracket shooting is switched over in accordance with a value measured by the acceleration sensor 110. Therefore, an image from which a multiplexed pattern can be easily decoded can be generated while suppressing a camera shake much more.

The first to third embodiments have explained an example in which the camera-equipped mobile terminal 104 is a camera-equipped mobile phone, camera-equipped smartphone, or tablet PC, and it captures a print product from above the print product, as shown in FIGS. 16, 17, and 19. However, the present invention is not limited to the camera-equipped mobile terminal that captures a print product from above the print product. For example, a wearable camera constituted by integrating the hardware components of a camera function, display function, and the like with spectacles can also be used. In this case, the user wears the wearable camera, captures a print product near him by the camera function, reads additional information embedded in the print product, and displays it on the display. At this time, when the user moves his face up, down, right, or left, or walks back, forth, right, or left, an acceleration sensor integrated in the wearable camera detects the motion. In accordance with this, a plurality of captured images may undergo super-resolution processing, or the amplitude of bracket shooting described above may be changed. Continuous shooting of a plurality of images, the bracket shooting processing method, and the like are the same as those described in the above embodiments.

In addition, all the above-described embodiments are applicable to even a case in which an image capturing device such as a car-mount camera can move around a print product.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-187034, filed Sep. 12, 2014, which is hereby incorporated by reference herein in its entirety.

What is claimed is:

1. An image processing apparatus that obtains information of a digital watermark based on an image obtained by causing an image capturing device to capture a print product in which the digital watermark is embedded, comprising:
   an image capturing unit configured to cause the image capturing device to capture a plurality of areas on the print product by repeating continuous shooting a plurality of times, wherein the continuous shooting is performed under a plurality of image capturing conditions;
   a selection unit configured to select, from a plurality of images obtained by the continuous shooting by said image capturing unit, an image from which the information of the digital watermark is to be obtained; and
   an obtaining unit configured to obtain the information of the digital watermark based on the image selected by said selection unit from the plurality of images obtained by the respective times of the continuous shooting by said image capturing unit,
   wherein the plurality of the image capturing conditions correspond to a plurality of different focal lengths to the print product, and
   wherein said selection unit selects an image by using a predetermined criterion corresponding to a degree of an edge contained in each of the plurality of images obtained by the continuous shooting.

2. The apparatus according to claim 1, further comprising a replay unit configured to replay content represented by the information of the digital watermark obtained by said obtaining unit.

3. The apparatus according to claim 1, wherein the image capturing device is integrated.

4. The apparatus according to claim 3, wherein the image capturing device includes:
   a first setting unit configured to set an image capturing condition upon performing the continuous shooting of the print product; and
   an evaluation unit configured to evaluate continuity of the plurality of images obtained by performing shooting under the image capturing condition set by said first setting unit.

5. The apparatus according to claim 1, wherein a focal length from the image capturing device to the print product is focused at a start of the continuous shooting in the image capturing device.

6. The apparatus according to claim 1, wherein the image processing apparatus performs super-resolution processing by using the plurality of images captured under the plurality of image capturing conditions, and performs processing of generating an image higher in resolution than an original image.

7. The apparatus according to claim 1, wherein the information of the digital watermark includes voice information, moving image information, and text information.

8. An image processing apparatus that obtains information of a digital watermark based on an image obtained by causing an image capturing device to capture a print product in which the digital watermark is embedded, comprising:
   an image capturing unit configured to cause the image capturing device to capture a plurality of areas on the print product by repeating shooting a plurality of times; and
   an obtaining unit configured to obtain the information of the digital watermark based on the image obtained by the respective times of the shooting by said image capturing unit,
   wherein the shooting by the image capturing device is hand-held shooting by a user,
   wherein the image capturing device further includes a detection unit configured to detect an acceleration of movement of the image capturing device by the hand-held shooting by the user, and
   wherein the image capturing device further includes a notification unit configured to notify the user to adjust at least one of a moving speed of the image capturing device and a distance from the image capturing device to the print product based on a result of detection by said detection unit during movement of the image capturing device by the hand-held shooting by the user.

9. The apparatus according to claim 8, wherein the repeated shooting is performed under a plurality of image capturing conditions, wherein the plurality of image capturing conditions includes at least one of the focal length to the print product, an F-number, and a shutter speed, and
   wherein the image obtained by the respective times of the shooting by said image capturing unit is selected by using a predetermined criterion corresponding to the plurality of image capturing conditions.

10. The apparatus according to claim 9, wherein the image capturing device further includes:
   a second setting unit configured to set a changeable range of one of the focal length, the F-number, and the shutter speed set as the image capturing condition; and
   a control unit configured to control to perform the shooting by changing a value of at least one of the plurality of the image capturing conditions within the range set by said second setting unit.

11. The apparatus according to claim 10, wherein the changeable range is one of a predetermined fixed value, a value statistically determined from the plurality of times of the continuous shooting executed previously, and a value dynamically obtained based on a result of detection by said detection unit.

12. The apparatus according to claim 9, wherein in a case where at least one of the plurality of the image capturing conditions includes the shutter speed, the image obtained by the respective times of the shooting by said image capturing unit is selected by using a predetermined criterion corresponding to a degree of blur in each of the plurality of images obtained by the plurality of times of the shooting by said image capturing unit.

13. The apparatus according to claim 8, wherein the image processing apparatus performs processing of performing alignment of a plurality of images obtained from shooting at different positions and composing the plurality of images into one image by using the plurality of images based on a result of detection by said detection unit.

14. The apparatus according to claim 8, wherein the image capturing unit causes the image capturing device to capture the plurality of areas on the print product by repeating continuous hand-held shooting by the user a plurality of times, wherein the continuous hand-held shooting is performed under a plurality of image capturing conditions,
wherein the apparatus further comprises a selection unit configured to select, from a plurality of images obtained by the continuous hand-held shooting by said image capturing unit, an image from which the information of the digital watermark is to be obtained, and
wherein the obtaining unit obtains the information of the digital watermark based on the image selected by said selection unit from the plurality of images obtained by the respective times of the continuous hand-held shooting by said image capturing unit.

15. The apparatus according to claim 14, wherein the image capturing device further includes a switch unit configured to switch over at least one of the plurality of the image capturing conditions based on a result of detection by said detection unit during movement of the image capturing device by the hand-held shooting by the user.

16. An image processing method for an image processing apparatus that obtains information of a digital watermark based on an image obtained by causing an image capturing device to capture a print product in which the digital watermark is embedded, comprising:
causing the image capturing device to capture a plurality of areas on the print product by repeating continuous shooting a plurality of times, wherein the continuous shooting is performed under a plurality of image capturing conditions;
selecting, from a plurality of images obtained by the continuous shooting by the image capturing device, an image from which the information of the digital watermark is to be obtained; and
obtaining information of the digital watermark by using the image selected from the plurality of images obtained by the respective times of the continuous shooting,
wherein the plurality of the image capturing conditions correspond to a plurality of F numbers, and
wherein an image is selected by using a predetermined criterion corresponding to both of a degree of focus and a degree of noise in each of the plurality of images obtained by the continuous shooting.

17. The method according to claim 16, further comprising replaying content represented by the information of the obtained digital watermark.

18. The method according to claim 16, wherein a focal length from the image capturing device to the print product is focused at a start of the continuous shooting in the image capturing device.

19. The method according to claim 16, wherein the image processing apparatus performs super-resolution processing by using the plurality of images captured under a plurality of the image capturing conditions, and performs processing of generating an image higher in resolution than an original image.

20. The method according to claim 16, wherein the information of the digital watermark includes voice information, moving image information, and text information.

21. An image processing apparatus that obtains information of a digital watermark based on an image obtained by causing an image capturing device to capture a print product in which the digital watermark is embedded, comprising:
an image capturing unit configured to cause the image capturing device to capture a plurality of areas on the print product by repeating continuous shooting a plurality of times, wherein the continuous shooting is performed under a plurality of image capturing conditions;
a selection unit configured to select, from a plurality of images obtained by the continuous shooting by said image capturing unit, an image from which the information of the digital watermark is to be obtained; and
an obtaining unit configured to obtain the information of the digital watermark based on the image selected by said selection unit from the plurality of images obtained by the respective times of the continuous shooting by said image capturing unit,
wherein the plurality of the image capturing conditions correspond to a plurality of different F-numbers, and
wherein said selection unit selects an image by using a predetermined criterion corresponding to both of a degree of a focus and a degree of noise in each of the plurality of images obtained by the continuous shooting.

22. An image processing method for an image processing apparatus that obtains information of a digital watermark based on an image obtained by causing an image capturing device to capture a print product in which the digital watermark is embedded, comprising:
causing the image capturing device to capture a plurality of areas on the print product by continuous shooting performed under a plurality of image capturing conditions;
selecting, from a plurality of images obtained by the continuous shooting by the image capturing device, an image from which the information of the digital watermark is to be obtained; and
obtaining the information of the digital watermark based on the image selected from the plurality of images obtained by the continuous shooting by the image capturing device,
wherein the plurality of the image capturing conditions correspond to a plurality of different focal lengths to the print product, and
wherein an image is selected by using a predetermined criterion corresponding to a degree of an edge contained in each of the plurality of images obtained by the continuous shooting.

* * * * *